United States Patent
Sarnoff et al.

(10) Patent No.: US 10,442,579 B2
(45) Date of Patent: Oct. 15, 2019

(54) METHOD OF MANUFACTURING AN IMPROVED DISPOSABLE LID

(71) Applicant: HFA, INC., Wheeling, IL (US)

(72) Inventors: Brad Sarnoff, Highland Park, IL (US); Raj Patel, Lake Zurich, IL (US)

(73) Assignee: HFA, Inc., Wheeling, IL (US)

( * ) Notice: Subject to any disclaimer, the term of this patent is extended or adjusted under 35 U.S.C. 154(b) by 0 days.

(21) Appl. No.: 16/100,637

(22) Filed: Aug. 10, 2018

(65) Prior Publication Data

US 2019/0077551 A1    Mar. 14, 2019

Related U.S. Application Data

(63) Continuation of application No. 15/700,569, filed on Sep. 11, 2017, now Pat. No. 10,086,981.

(51) Int. Cl.
| | |
|---|---|
| *B65D 43/02* | (2006.01) |
| *B65D 81/34* | (2006.01) |
| *B65D 21/02* | (2006.01) |
| *B21D 22/02* | (2006.01) |
| *A47J 47/14* | (2006.01) |
| *A47J 36/02* | (2006.01) |
| *B65D 77/20* | (2006.01) |

(52) U.S. Cl.
CPC ........ *B65D 43/0233* (2013.01); *A47J 36/022* (2013.01); *A47J 47/14* (2013.01); *B21D 22/02* (2013.01); *B65D 21/0233* (2013.01); *B65D 77/2012* (2013.01); *B65D 81/34* (2013.01); *B65D 2543/00027* (2013.01); *B65D 2543/00101* (2013.01); *B65D 2543/00277* (2013.01); *B65D 2543/00527* (2013.01); *B65D 2543/00537* (2013.01)

(58) Field of Classification Search
CPC ............ B65D 21/0233; B65D 43/0202; B65D 2543/00194; B65D 81/34; B21D 22/02
See application file for complete search history.

(56) References Cited

U.S. PATENT DOCUMENTS

| | | |
|---|---|---|
| 521,033 A | 6/1894 | Marzynski |
| 1,064,532 A | 6/1913 | Peacock |

(Continued)

FOREIGN PATENT DOCUMENTS

| | | |
|---|---|---|
| EP | 0447693 | 6/1994 |
| WO | 8911423 | 11/1989 |

OTHER PUBLICATIONS

Reynolds Metal RL970 Rigid Aluminum Lid, Amazon, amazon. com, ASIN: B0002ZWLJQ, Aug. 15, 2007.

(Continued)

*Primary Examiner* — Kareen K Thomas
(74) *Attorney, Agent, or Firm* — Adam K. Sacharoff; Much Shelist, P.C.

(57) ABSTRACT

In accordance with one embodiment of the invention, there is provided an improved disposable aluminum lids configured for use with a pan. The lid has a continuously rolled lip around a skirt that when placed on the pan is bent to secure the two together. The rolled lip around the entire periphery of the skirt includes both the sides and the corners of the improved disposable aluminum lid. This significantly reduces the possibility of cuts and injuries to the user with securing the lid to the pan or removing it therefrom.

2 Claims, 25 Drawing Sheets

(56) References Cited

U.S. PATENT DOCUMENTS

| | | | |
|---|---|---|---|
| 2,216,147 A | 10/1940 | Ward | |
| 2,669,914 A | 2/1954 | Swaine | |
| 3,021,990 A | 2/1962 | Dusky | |
| 3,262,668 A | 7/1966 | Luker | |
| 4,113,095 A * | 9/1978 | Dietz | B65D 1/34 |
| | | | 206/508 |
| 4,412,630 A | 11/1983 | Daenen | |
| D287,803 S | 1/1987 | Daenen et al. | |
| D312,406 S | 11/1990 | Tyler | |
| 4,971,216 A * | 11/1990 | Fortune | A47J 36/022 |
| | | | 220/573.1 |
| D360,105 S | 7/1995 | Doxey | |
| D363,663 S | 10/1995 | Plater | |
| D372,174 S | 7/1996 | Arduini | |
| D391,762 S | 3/1998 | Ahern | |
| 6,065,629 A | 5/2000 | Sarnoff | |
| D426,064 S | 6/2000 | Douglas et al. | |
| 6,142,332 A | 11/2000 | Ferrara | |
| D439,159 S | 3/2001 | Chen | |
| 6,213,005 B1 * | 4/2001 | Sherman | A47J 27/002 |
| | | | 220/573.1 |
| D443,184 S | 6/2001 | Maxwell et al. | |
| 6,276,044 B1 * | 8/2001 | Ragland | B21D 13/00 |
| | | | 29/521 |
| D449,522 S | 10/2001 | Brown | |
| D455,605 S | 4/2002 | Dretzka | |
| 6,415,945 B1 | 7/2002 | Zank et al. | |
| D470,048 S | 2/2003 | Buchalski et al. | |
| D472,773 S | 4/2003 | Samartgis | |
| D478,775 S | 8/2003 | Tanji | |
| D502,049 S | 2/2005 | Munson | |
| D505,840 S | 6/2005 | Schultz | |
| D509,705 S | 9/2005 | Armer | |
| D513,383 S | 1/2006 | Glander et al. | |
| D533,059 S | 12/2006 | Knutson et al. | |
| D571,200 S | 6/2008 | Bouveret et al. | |
| D585,734 S | 2/2009 | Doliwa | |
| D593,855 S | 6/2009 | Scheve | |
| D598,197 S | 8/2009 | Ahlstrom | |
| D608,592 S | 1/2010 | Curtin | |
| D638,704 S | 5/2011 | Petlak et al. | |
| 8,006,843 B1 | 8/2011 | McFarland | |
| D646,923 S | 10/2011 | Chhay | |
| 8,074,830 B2 | 12/2011 | Pomfrey | |
| D668,910 S | 10/2012 | Sarnoff | |
| D675,909 S | 2/2013 | Barbier et al. | |
| D685,265 S | 7/2013 | Turvey | |
| D694,062 S | 11/2013 | Andres | |
| D730,112 S | 5/2015 | Yessin | |
| D735,524 S | 8/2015 | Holding et al. | |
| D740,601 S | 10/2015 | Carlson | |
| D755,578 S | 5/2016 | Wu | |
| 9,340,330 B2 | 5/2016 | LeBoeuf | |
| D762,471 S | 8/2016 | Green et al. | |
| D770,277 S | 11/2016 | Carlson | |
| D771,431 S | 11/2016 | Affatato et al. | |
| D771,432 S | 11/2016 | Affatato | |
| 9,510,699 B1 * | 12/2016 | Miller | A47G 19/12 |
| D776,932 S | 1/2017 | Reinhart | |
| D801,110 S | 10/2017 | Sarnoff | |
| D802,361 S | 11/2017 | Sarnoff | |
| 2003/0080014 A1 | 5/2003 | Ridgeway | |
| 2009/0321462 A1 | 12/2009 | Huil | |
| 2010/0170204 A1 | 7/2010 | Altheimerl | |
| 2013/0037430 A1 | 2/2013 | Sarnoff | |
| 2015/0136633 A1 | 5/2015 | Sarnoff | |

OTHER PUBLICATIONS

Popular hot selling Disposable Aluminum Foil Serving Trays, Alibaba, alibaba.com, accessed: May 2017.

Pactiv Y112045 Disposable Full Size Food Pan Lid, Dine Company, dinecompany.com, Product ID: Y112045, accessed: May 2017.

Nest™ Storage, Joseph Joseph®, josephjoseph.com, accessed: May 2017.

Glad Food Storage Containers, Family Size, 104 Ounce, 3 Count, Amazon, amazon.com, ASIN: B019G0JOA6, Dec. 16, 2015.

Copending U.S. Appl. No. 15/586,547; USPTO Office Action; dated Jun. 30, 2017.

Copending U.S. Appl. No. 29/579,142; USPTO Restriction Requirement; dated Jul. 19, 2017.

"Handi-Foil 1/2-sz Foil Steam Lid". USPTO Found online Jun. 30, 2017 at amazon.com. Page dated Apr. 18, 2006 Retrieved from https://www.amazon.com/FHA204930-2-Foil-Steam-Fits/dp/Boo4W4W6HY/ref=cm_cr_arp_d_product_top?is=UTF8%2004.18. 2006.

"A World of Deals Aluminum Foil Lids for Steam Table". USPTO Found online Jun. 30, 2017 at amazon.com. Page dated Jan. 14, 2015. Retrieved from https://www.amazon.com/World-Deals-Aluiminum-Steam-Half-Size/dp/B00S8K8CI6/ref=sr_1_2?ie=UTF8 &qid=1497555442&sr=8-2&keywords=foil+lid%2001.14.2015.

"TigerChef Aluminum Foil Lids for Half Size Steam Table Pans," USPTO Found online Jun. 30, 2017 at amazon.com. Page dated Jul. 14, 2015. Retrieved from https://www.amazon.com/TigerChef-TC-20488-Aluminum-Recipe-13/dp/B00TSRKHBI/ref=cm_cr_arp_d_product_top?ie=UTF8.

"FREEDco Aluminum ½ Size Lids". USPTO Found online Jun. 30, 2017 at amazon.com. Page dated Dec. 6, 2015. Retrieved from https://www.amazon.com/FREEDco-Auminum-Lids-Steam-Multi-Purpose/dp/B01N6DXX1J/ref=sr_1_20?ie=UTF8&qip=149555511 &sr=9-29&keywords-foil+lid.

Co-pending U.S. Appl. No. 29/598,097, filed Mar. 23, 2017 Restriction Requirement with IDS, dated Jul. 10, 2017.

Co-pending U.S. Appl. No. 29/598,097, filed Mar. 23, 2017 Office Action, dated Aug. 9, 2017.

Corresponding Mexican Patent Application, Office Action issued by IMPI dated Jul. 10, 2017. Single Reference Rejection U.S. Pat. No. 6,415,945.

Corresponding U.S. Appl. No. 29/579,142 Notice of Allowance issued by USPTO dated Sep. 19, 2017.

Corresponding U.S. Appl. No. 29/610,841 Notice of Allowance issued by USPTO dated Dec. 13, 2017.

Corresponding U.S. Appl. No. 29/612,224 Notice of Allowance issued by USPTO dated Dec. 12, 2017.

Corresponding U.S. Appl. No. 29/598,097, Notice of Allowance issued by USPTO dated Sep. 20, 2017.

Corresponding U.S. Appl. No. 15/586,547 Office Action mailed by USPTO dated Jan. 16, 2018.

Corresponding U.S. Appl. No. 15/586,547 Interview Summary mailed by USPTO dated Feb. 7, 2018.

Corresponding U.S. Appl. No. 15/700,569 Office Action mailed by USPTO dated Feb. 23, 2018.

Corresponding Canadian Application, Serial No. 2967480, Office Action dated Apr. 9, 2018.

Co-pending U.S. Appl. No. 15/586,547, Notice of Allowance dated May 25, 2018.

* cited by examiner

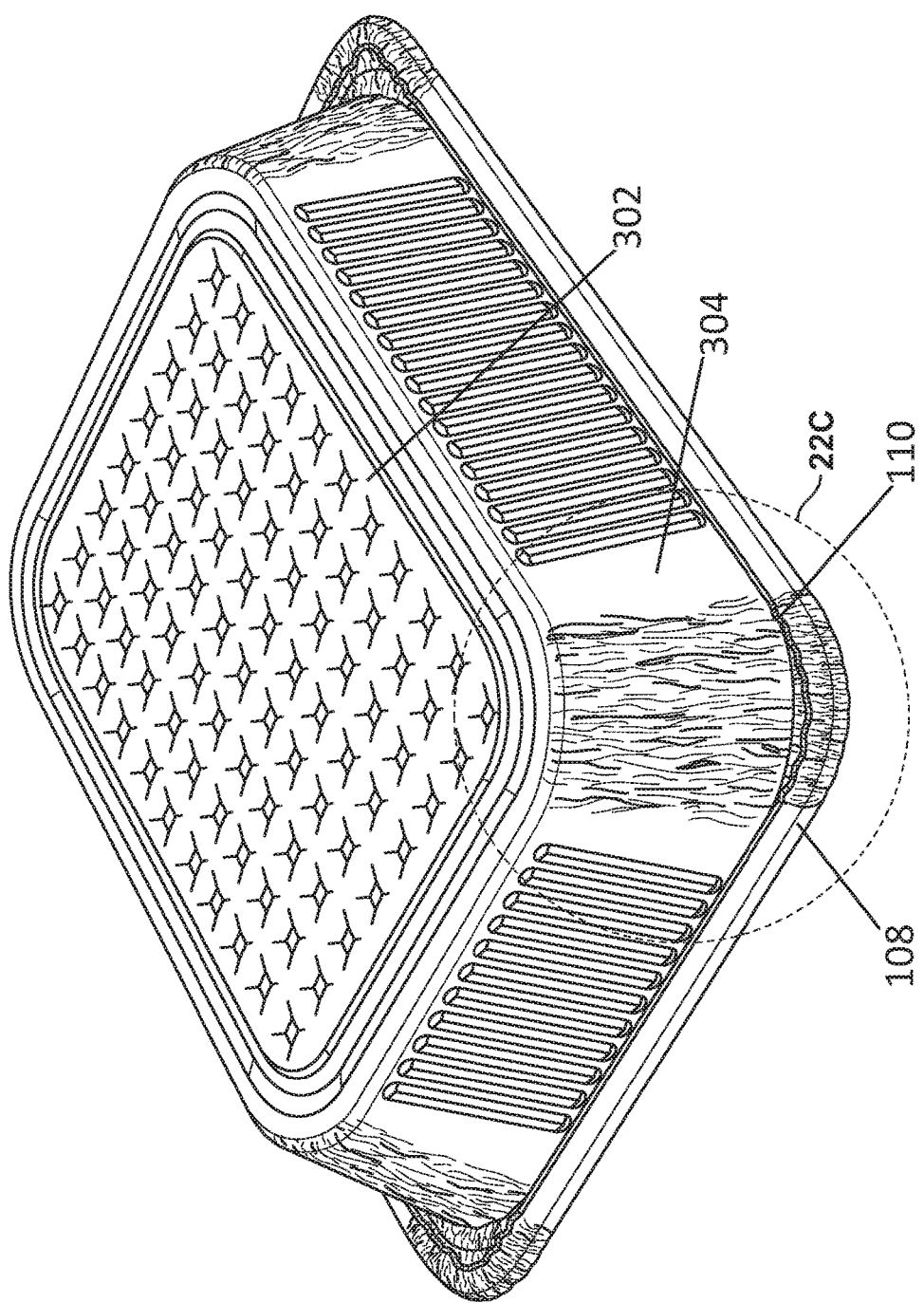

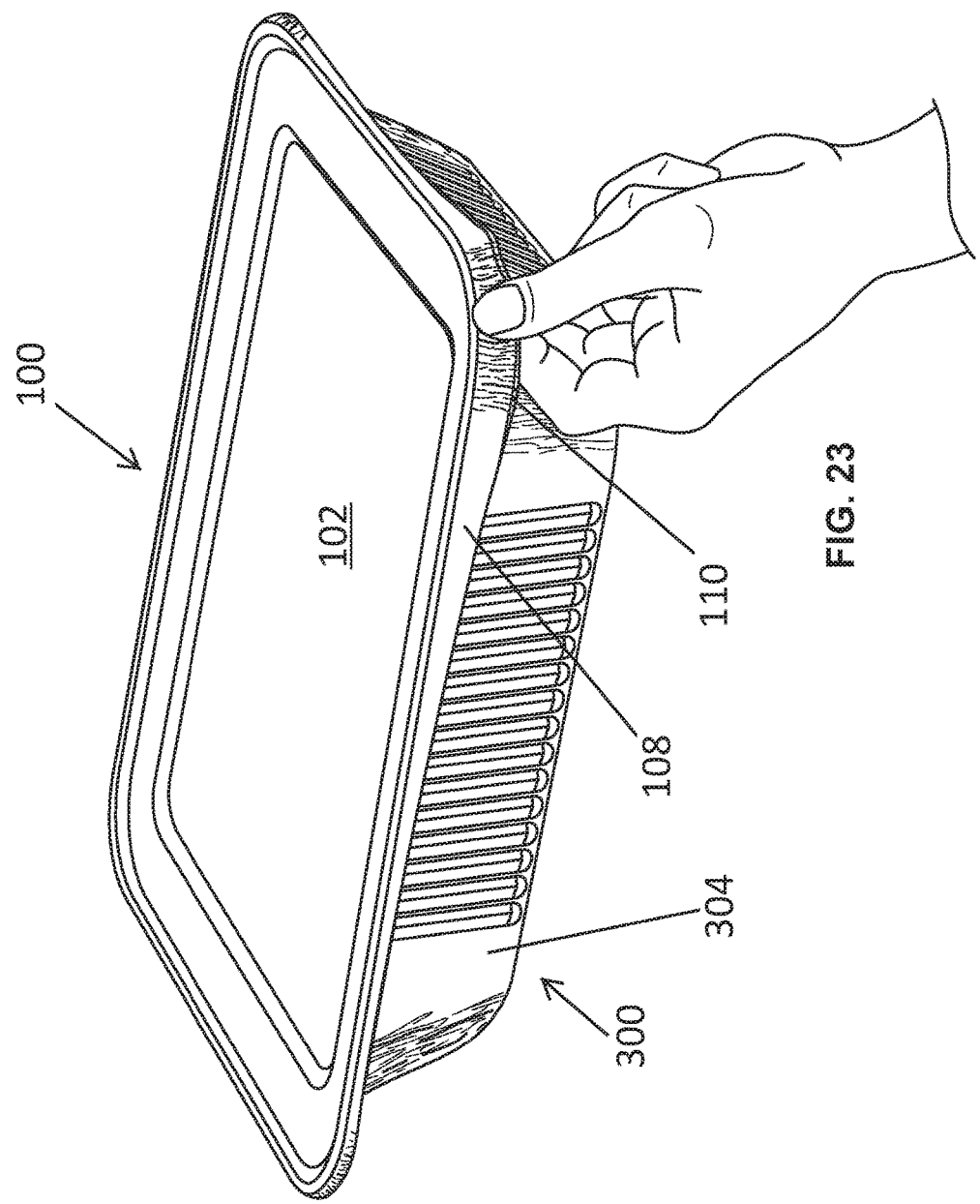

METHOD OF MANUFACTURING AN IMPROVED DISPOSABLE LID

CROSS REFERENCE TO OTHER APPLICATIONS

The present application is a continuation of U.S. Utility application Ser. No. 15/700,569, which is a continuation in part of U.S. Utility application Ser. No. 15/586,547, which is a continuation of U.S. Utility application Ser. No. 15/466,910, which is a continuation in part of U.S. Design application Ser. No. 29/579,142 filed Sep. 28, 2016 for a LID FOR A PAN.

FIELD OF THE INVENTION

The present invention relates to the art of lids manufactured from aluminum such that the lids are disposable, and more particularly, the present invention is directed to a method of manufacturing an improved disposable lid that helps alleviate accidents by the consumer and permits nesting of the lids.

BACKGROUND OF THE INVENTION

Disposable aluminum pans and lids are often referred to as foil pans/lids widely used by consumers to cook and keep food warm. The lids have been manufactured by well know methods. Typically a die is used to stamp a sheet of aluminum into a lid. During the stamping process upper and lower dies are pressed together with the sheet of aluminum feed between the dies. After pressing the lid is formed. The main issues with the existing lids (Prior Art FIGS. 1A-3) is that the dies are formed such that only the edges between the corners have a rolled lip. The corners are not rolled which often leaves a sharp edge from which consumers can and often cut themselves on the corner edges. In addition, the dies are formed such that the edge walls extend at a ninety degree angle from the top edge of the lid. As shown in Prior Art FIG. 16, the prior art lids cannot stack and nest properly. This makes shipping a lot of lids together problematic. A lot of space in shipping cartons are wasted because stacked lids simply do not nest properly and the nested lids take up a lot of space. These problems are addressed with the manufacturing of improved lids.

SUMMARY OF THE INVENTION

In accordance with one embodiment of the present invention, there is provided a method of manufacturing an improved disposable aluminum lid.

The improved disposable aluminum lid is formed from stamping aluminum. The improved disposable aluminum lid includes a top base that terminates about an edge to raised ridge around the periphery of the edge. The raised ridge extends into a downwardly extending skirt. The skirt terminates into a rolled lip formed into the sides of the improved disposable aluminum lid. In addition, during the forming of the improved disposable aluminum lid the corners of the skirt are crimped and rolled into a corner rolled lip of aluminum. The corner rolled lip in the corners prevents the user from cutting themselves when handling. In addition, the improved disposable aluminum lid is formed with a slight tapering β between the raised ridge and the downwardly extending skirt. Preferably the tapering is defined at an angle between 3 and 10 degrees and more preferably at about 5 degrees. Therefore, when stacking or nesting the improved disposable aluminum lids, the lids nest easily and virtually perfectly on top of each other. As such, the improved disposable aluminum lid can be packaged and shipped without concern of damage to the lids.

In other embodiments, there is provided in combination an improved disposable aluminum lid for use with a pan. The pan is defined to have a bottom base terminating into a side wall. The side wall extends continuously around the bottom base to form a well there between. The side wall also includes a top edge that extends outwardly away from the well to form a ledge, and wherein the ledge ends into a rolled lip formed. The lid has a top base terminating around a periphery at an edge. A raised ridge extends around the periphery of the edge. A skirt extends downwardly from the raised ridge and extends continuously around the top base to form a well there-between. The skirt has an internal surface side facing the well and an external surface side. The skirt further has a lower edge configured to extend directly into a rolled lip. The rolled lip is formed continuously into the lower edge of the skirt and uninterruptedly around the well covering all sides and all corners defined by the lid. The rolled lip is further configured to abut the external surface side of the skirt. The lid and pan and configured such that the lid has a size such that when positioned on top of the pan, the skirt and rolled lip, defined on the lid, hangs over the ledge, defined on the pan. When bent the skirt and rolled lip can be positioned against an underside surface defined on the ledge to configure the lid and the pan into a secured configuration.

Numerous other advantages and features of the invention will become readily apparent from the following detailed description of the invention and the embodiments thereof, from the claims, and from the accompanying drawings.

BRIEF DESCRIPTION OF THE DRAWINGS

A fuller understanding of the foregoing may be had by reference to the accompanying drawings, wherein:

FIG. 22B is a perspective view of FIG. 22A from underneath the lid and pan;

FIG. 23 is a perspective view of FIG. 22 further illustrating a user bending the downwardly extending skirt and rolled lip away from the pan ledge in order to remove the lid.

DETAILED DESCRIPTION OF THE EMBODIMENTS

Figure 1A:
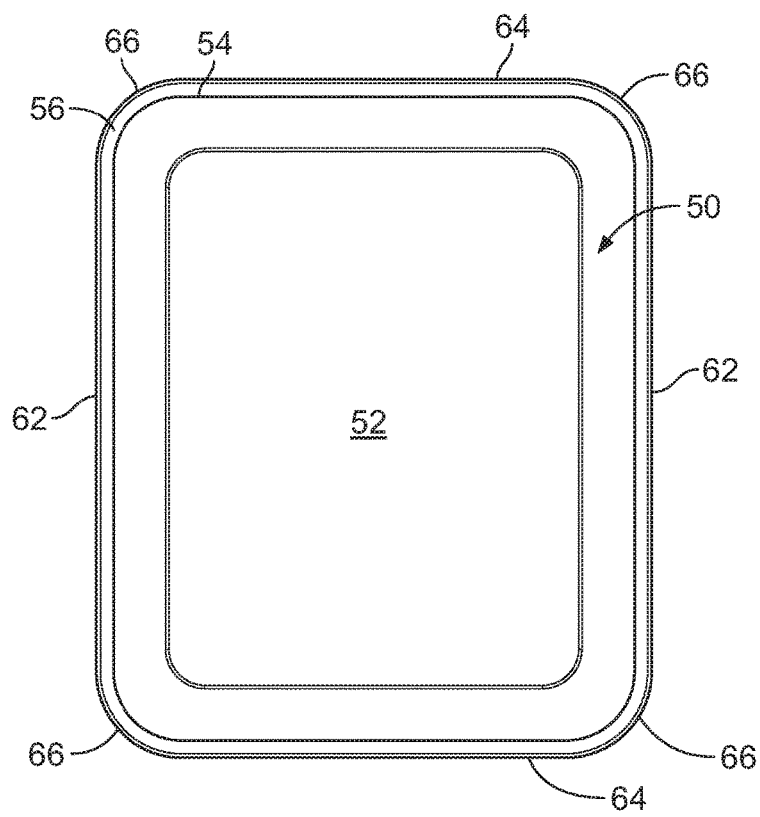
FIG. 1A is a prior art top plan view of a disposable aluminum lid.
Figure 1B:
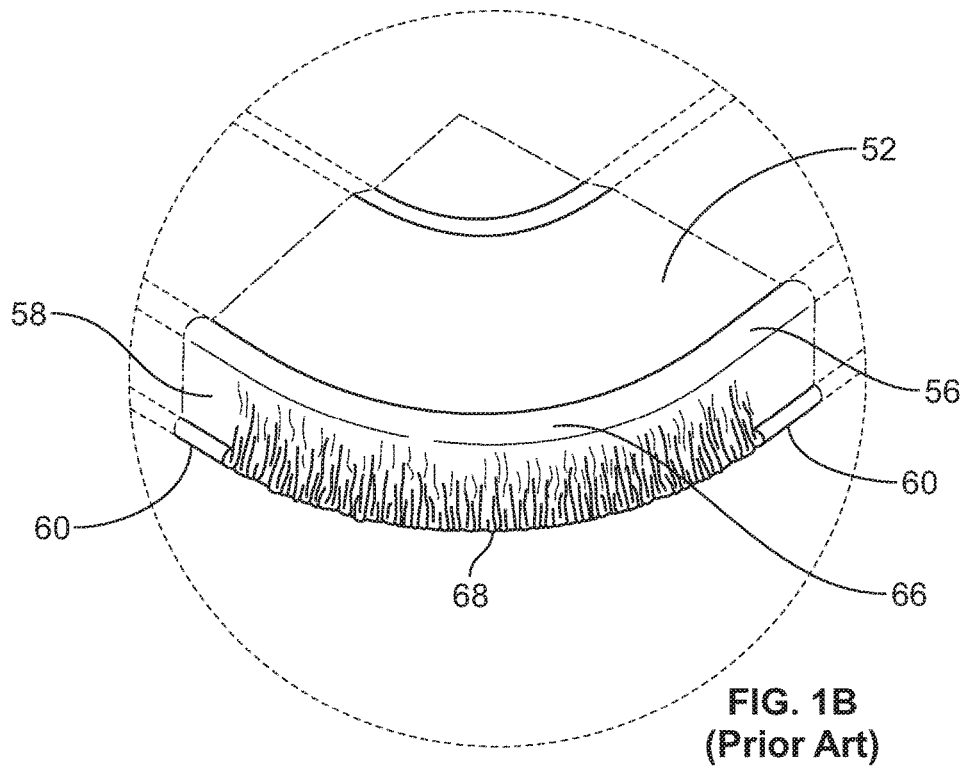
FIG. 1B is a sectional view of a corner from the disposable aluminum lid of FIG. 1A.
Figure 1C:
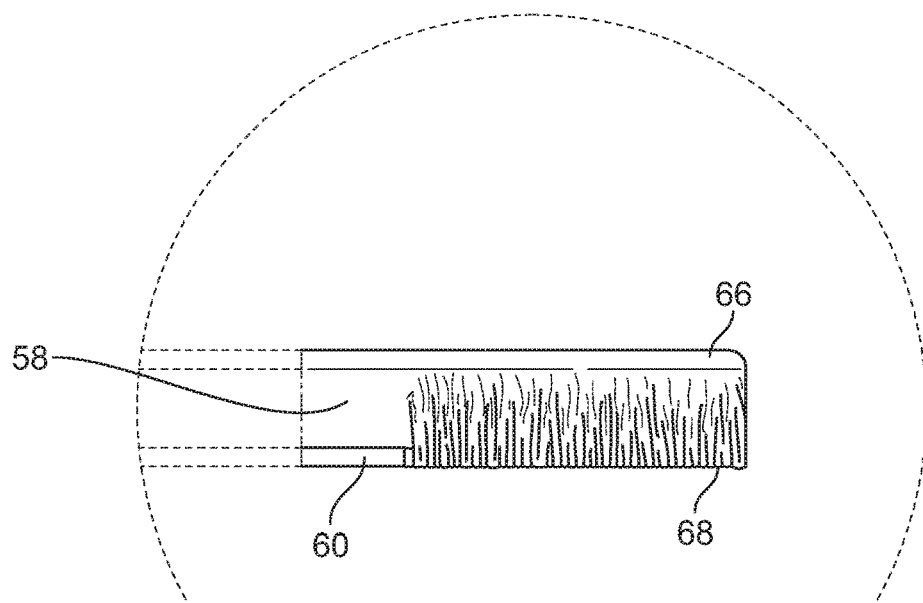
FIG. 1C is a side sectional view of the corner of the disposable aluminum lid of FIG. 1A.
Figure 2:
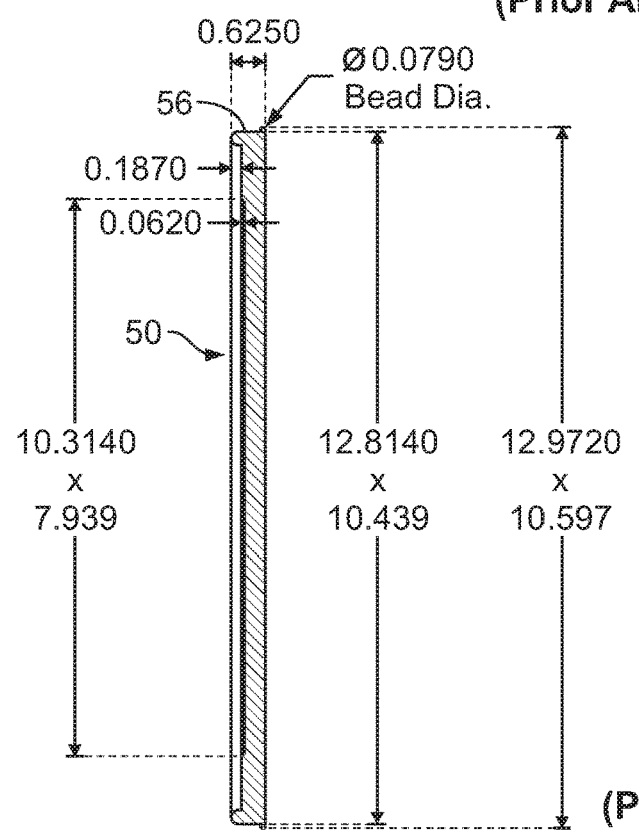
FIG. 2 is a prior art side view of the disposable aluminum lid from FIG. 1.
Figure 3:
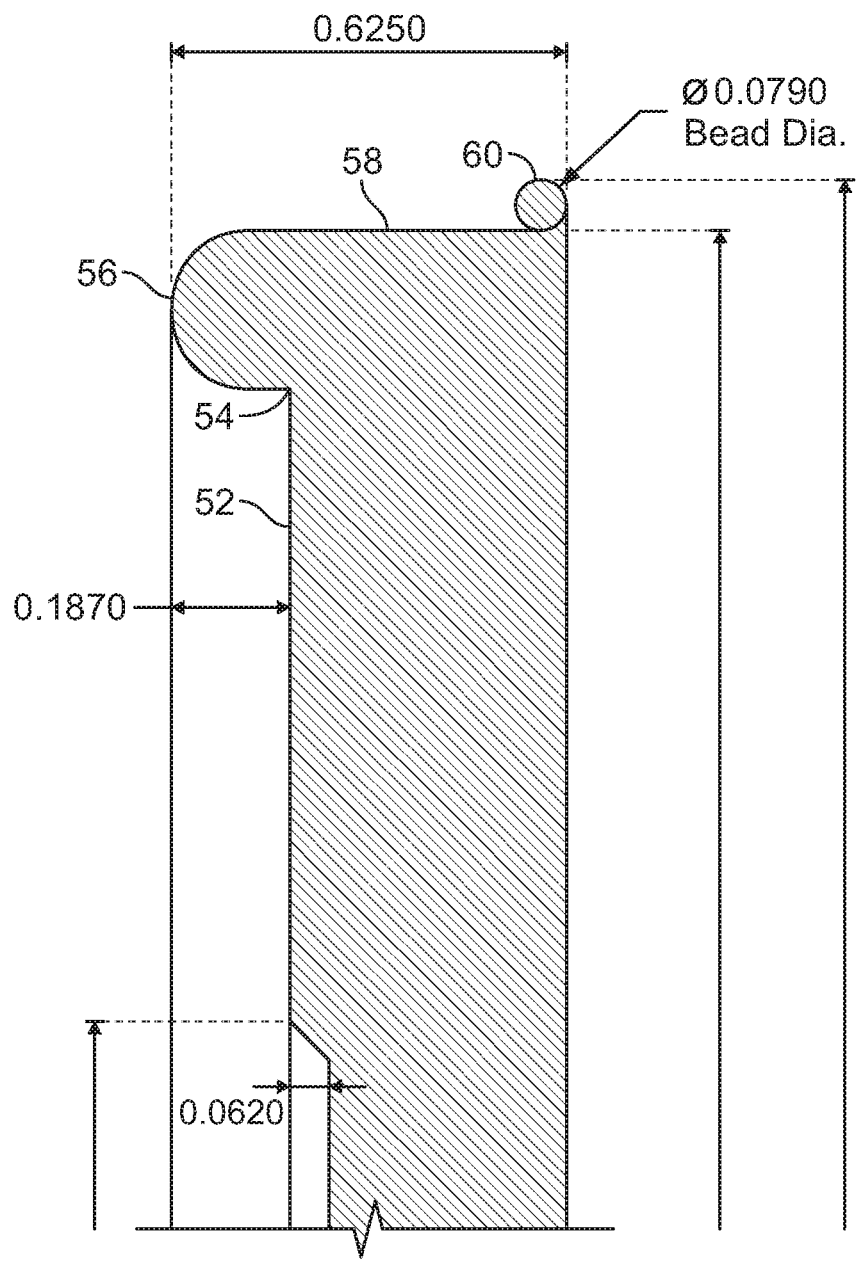
FIG. 3 is an enlarged prior art cross sectional view of the disposable aluminum lid from FIG. 1.
Figure 4A:
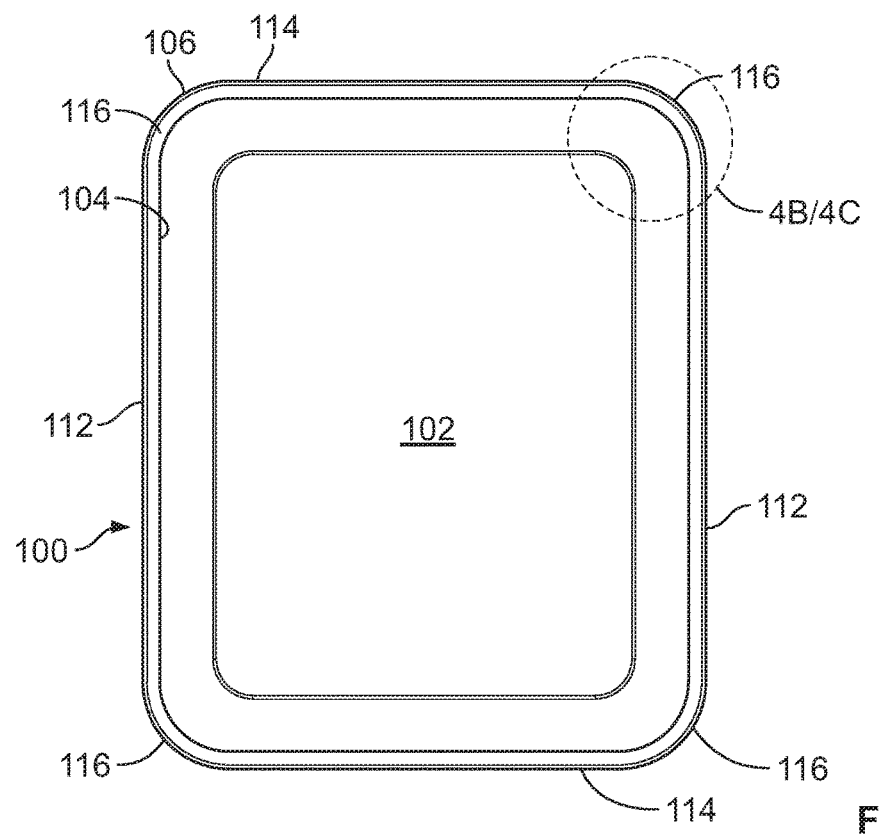
FIG. 4A is a top plan view of an improved disposable aluminum lid.
Figure 4B:
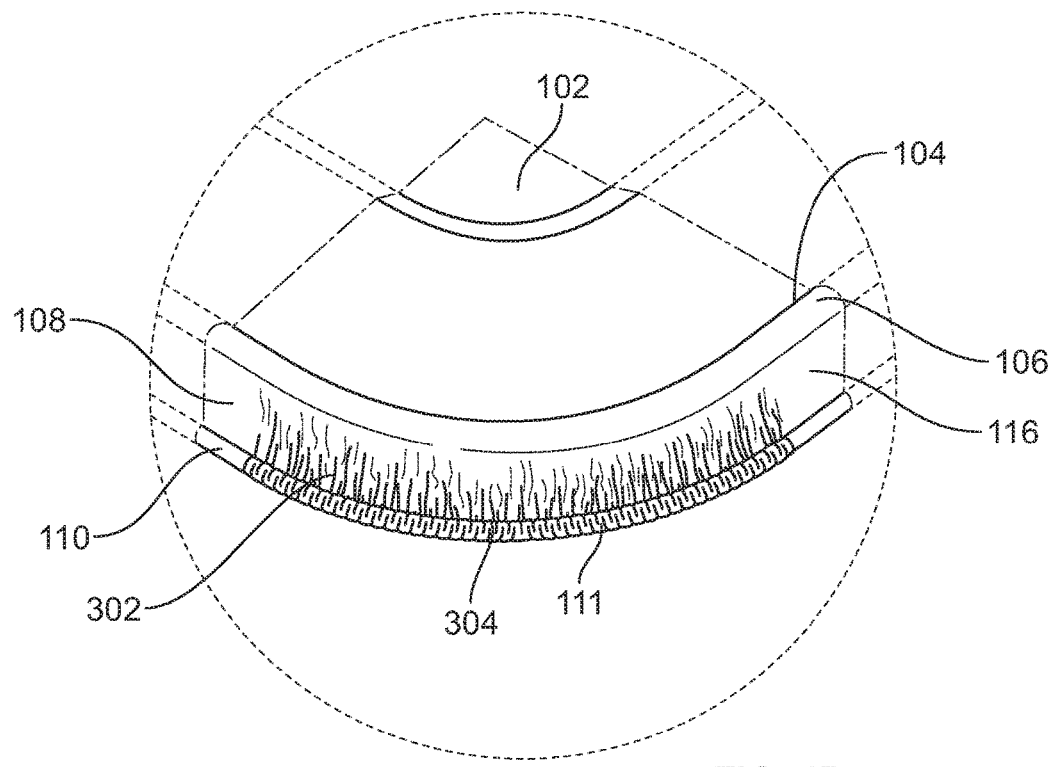
FIG. 4B is a sectional view of a corner from the improved disposable aluminum lid of FIG. 4A.
Figure 4C:
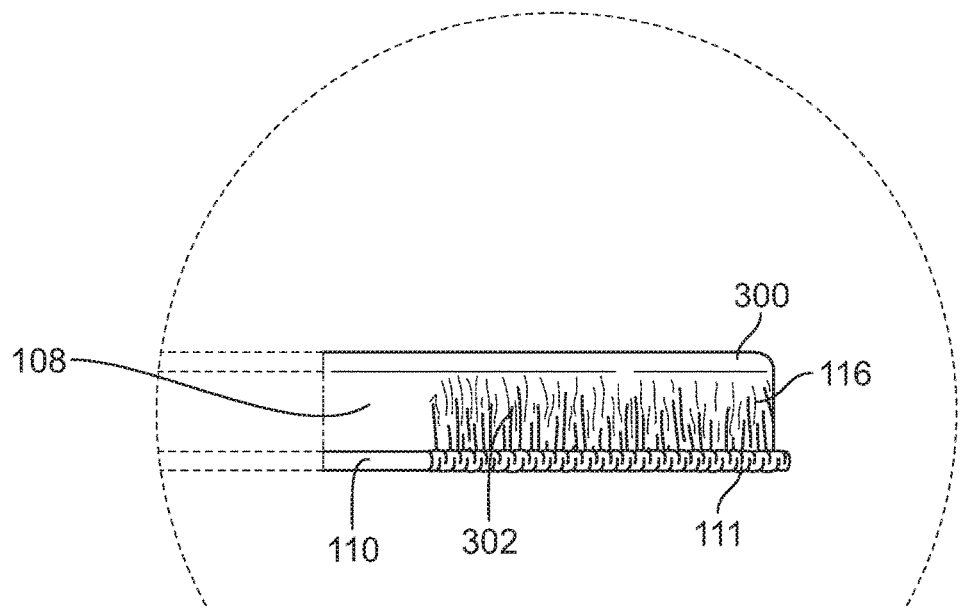
FIG. 4C is a side sectional view of the corner of the improved disposable aluminum lid of FIG. 4A.
Figure 5:
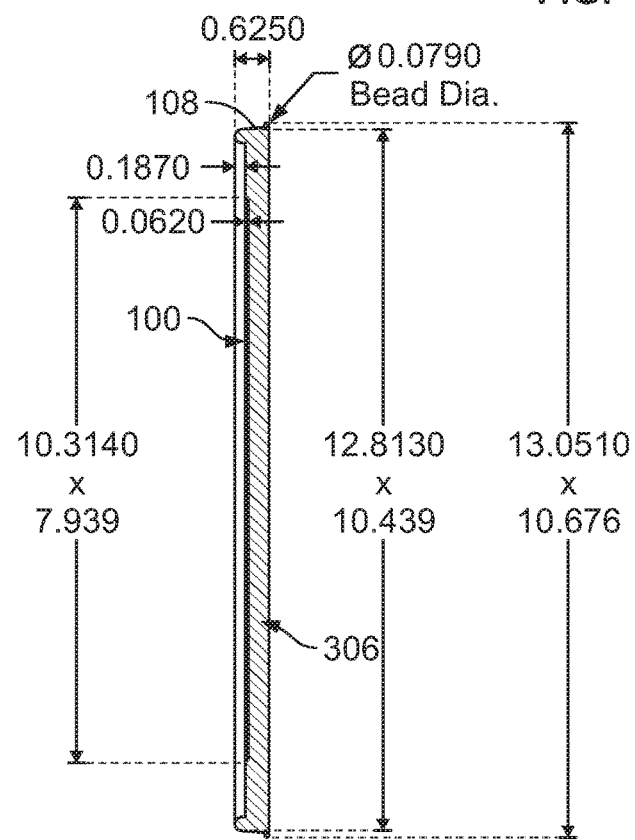
FIG. 5 is a side view of the improved disposable aluminum lid of FIG. 4A.
Figure 6:
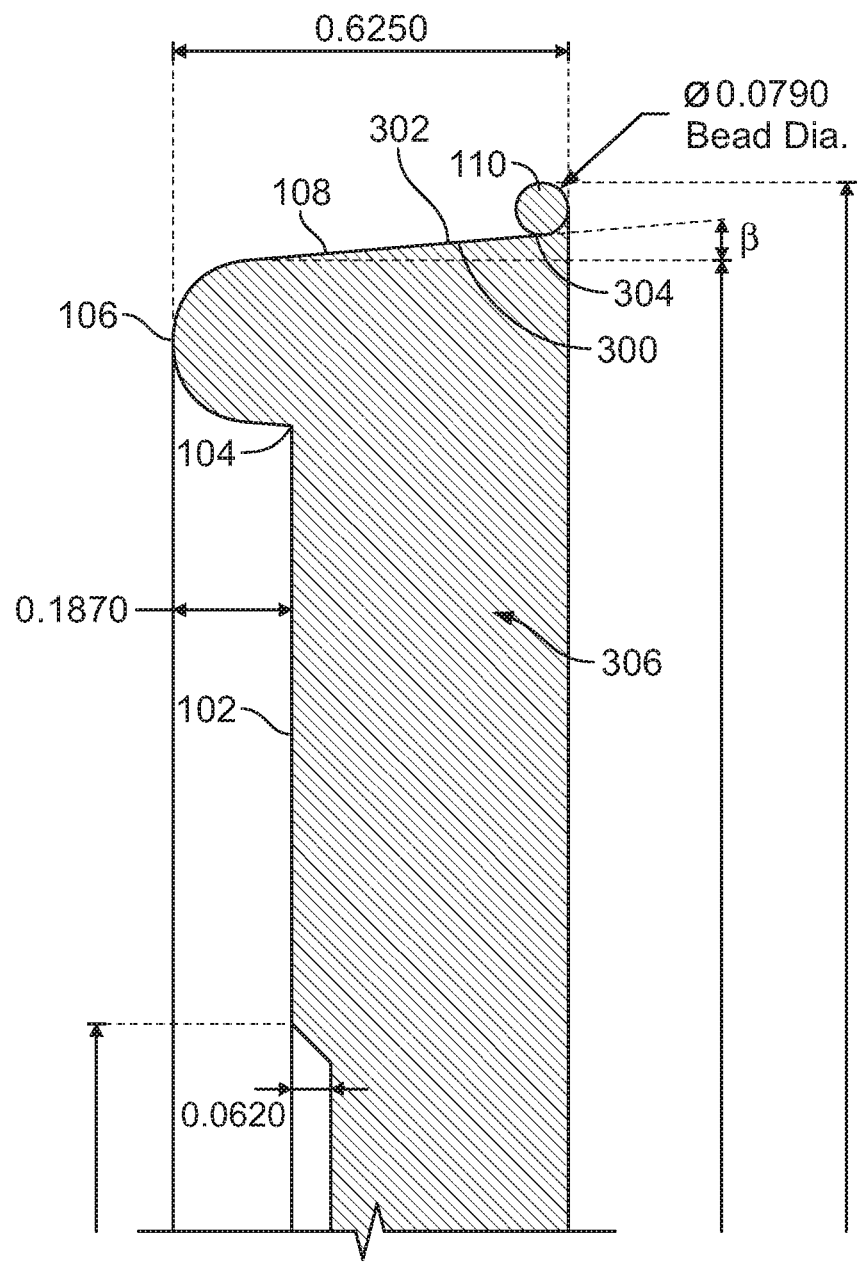
FIG. 6 is an enlarged cross sectional view of the improved disposable aluminum lid of FIG. 4A.
Figure 7:
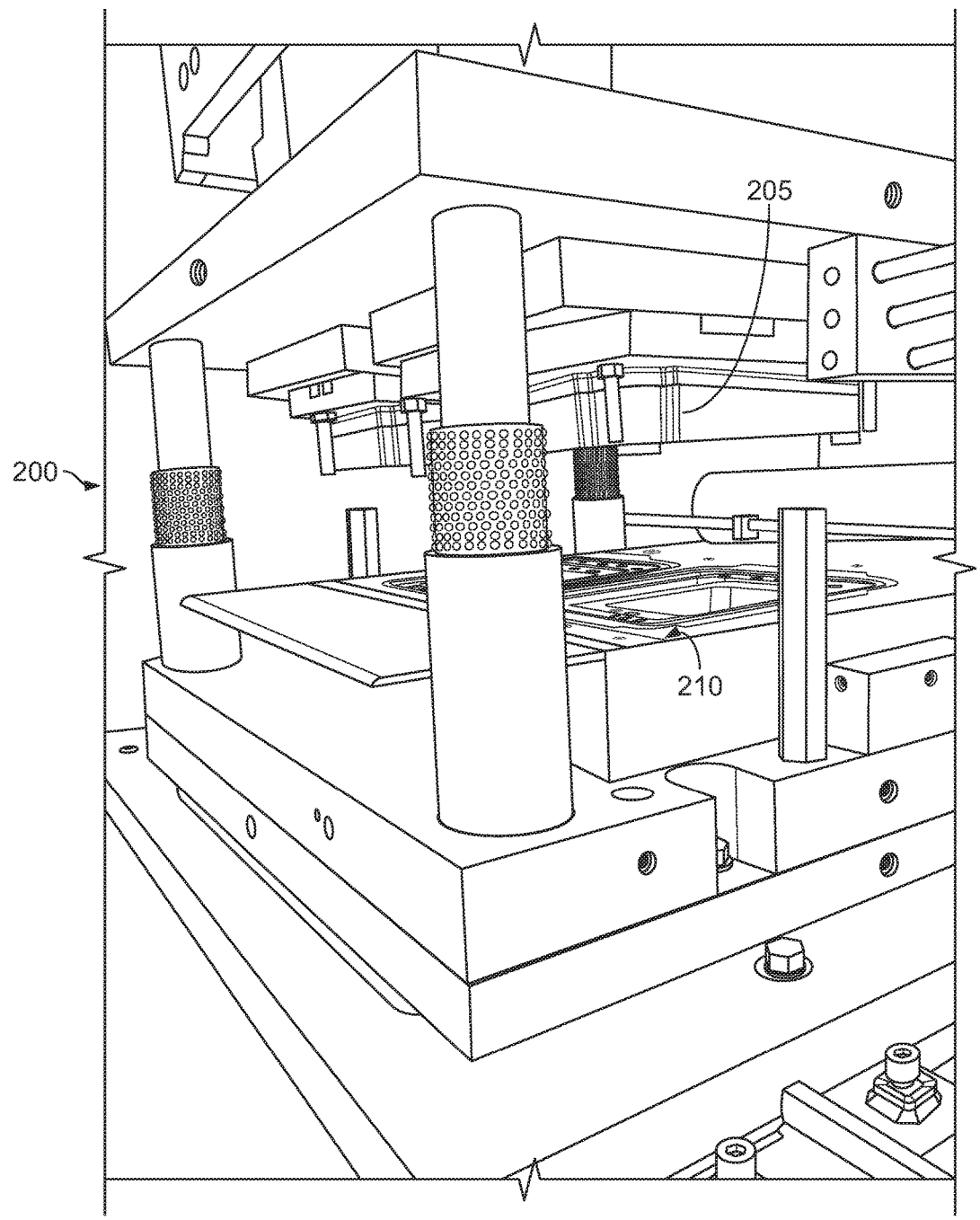
FIG. 7 is a representation of a stamp machine used in manufacturing the improved disposable aluminum lid of FIG. 4A.
Figure 8:
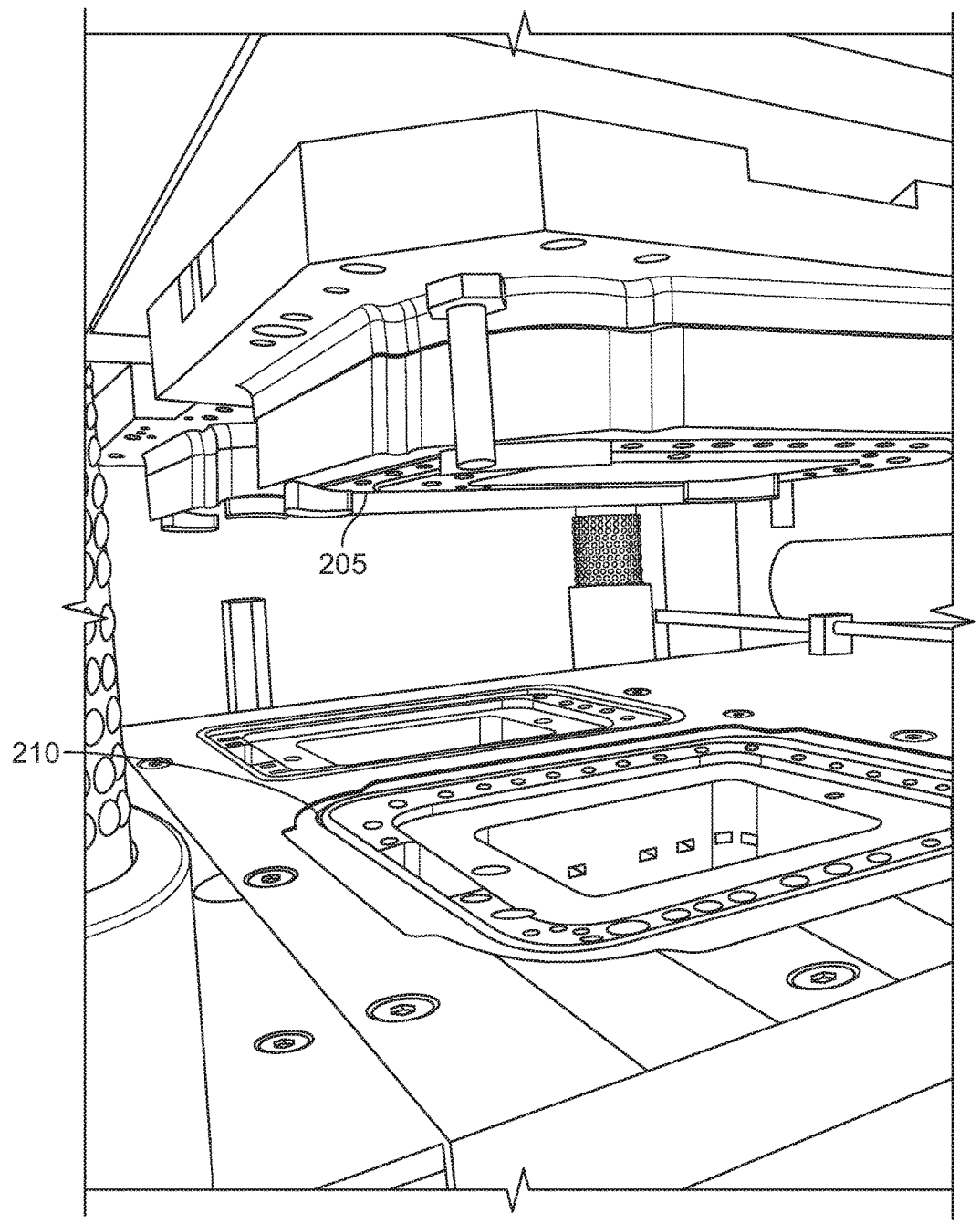
FIG. 8 is a representation of the press stamping showing the upper and lower dies.
Figure 9:
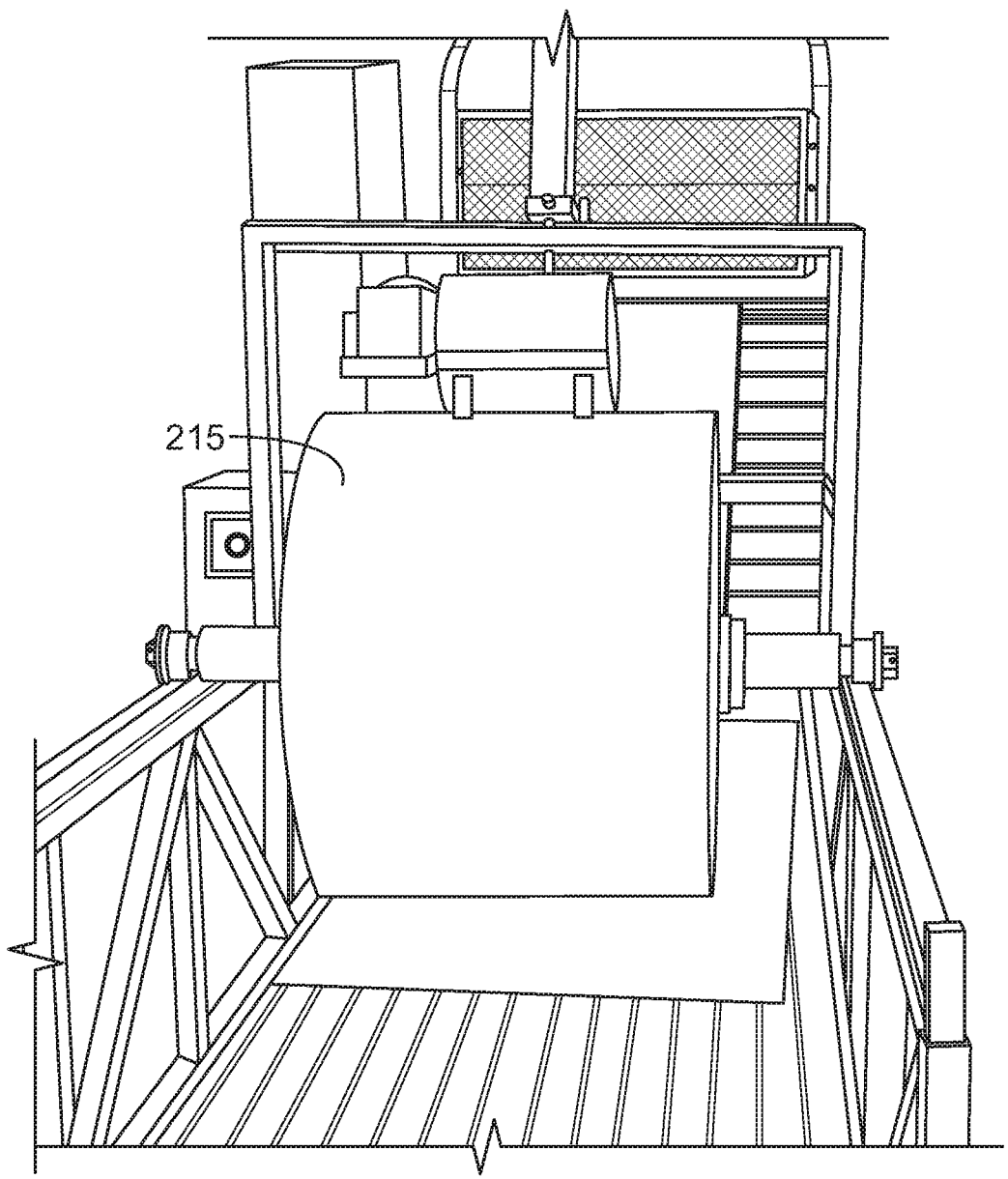
FIG. 9 is a representation of an aluminum roll used in manufacturing improved disposable aluminum lids.
Figure 10:
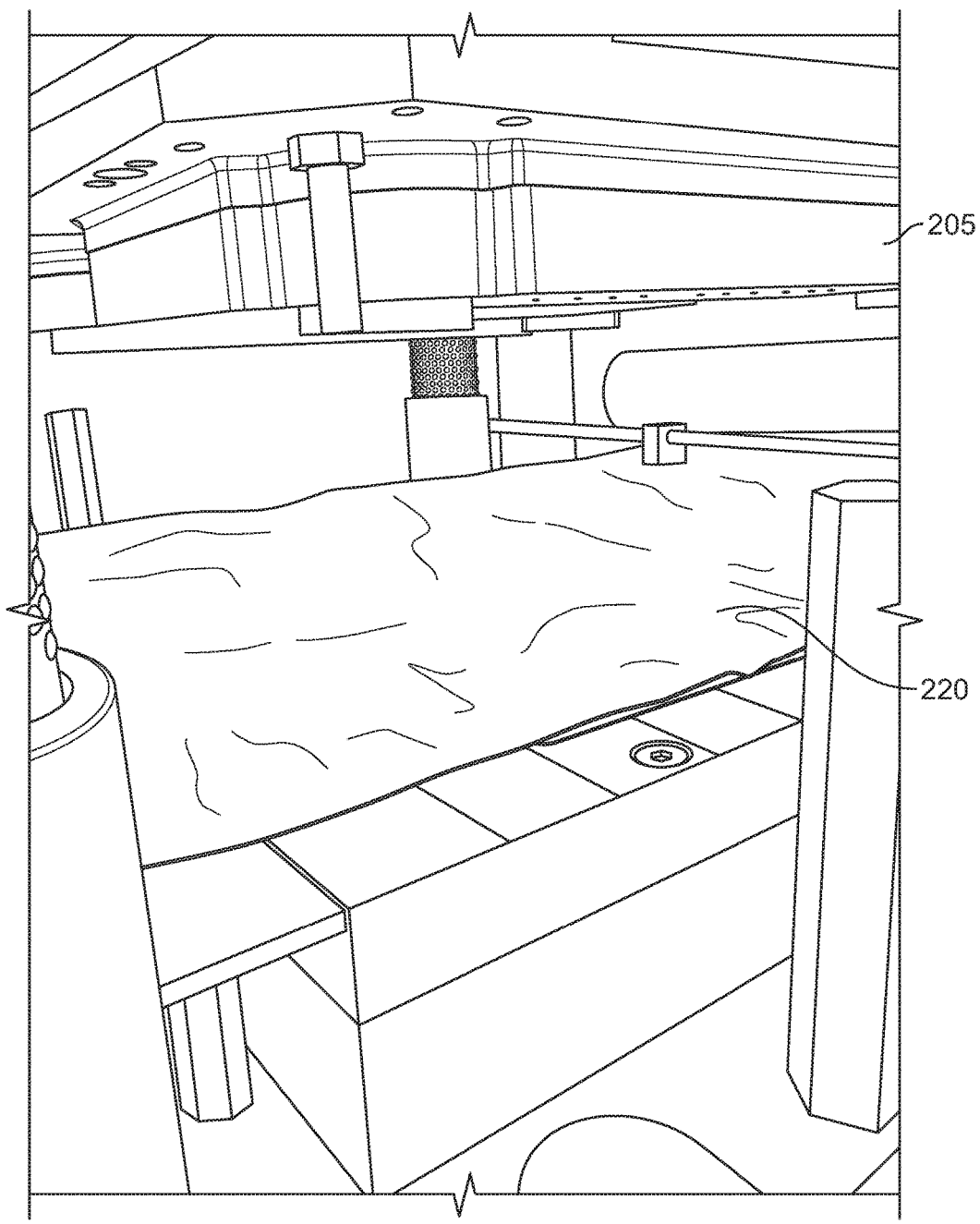
FIG. 10 is a representation of the aluminum feed between the upper and lower dies of the stamping machine.
Figure 11:
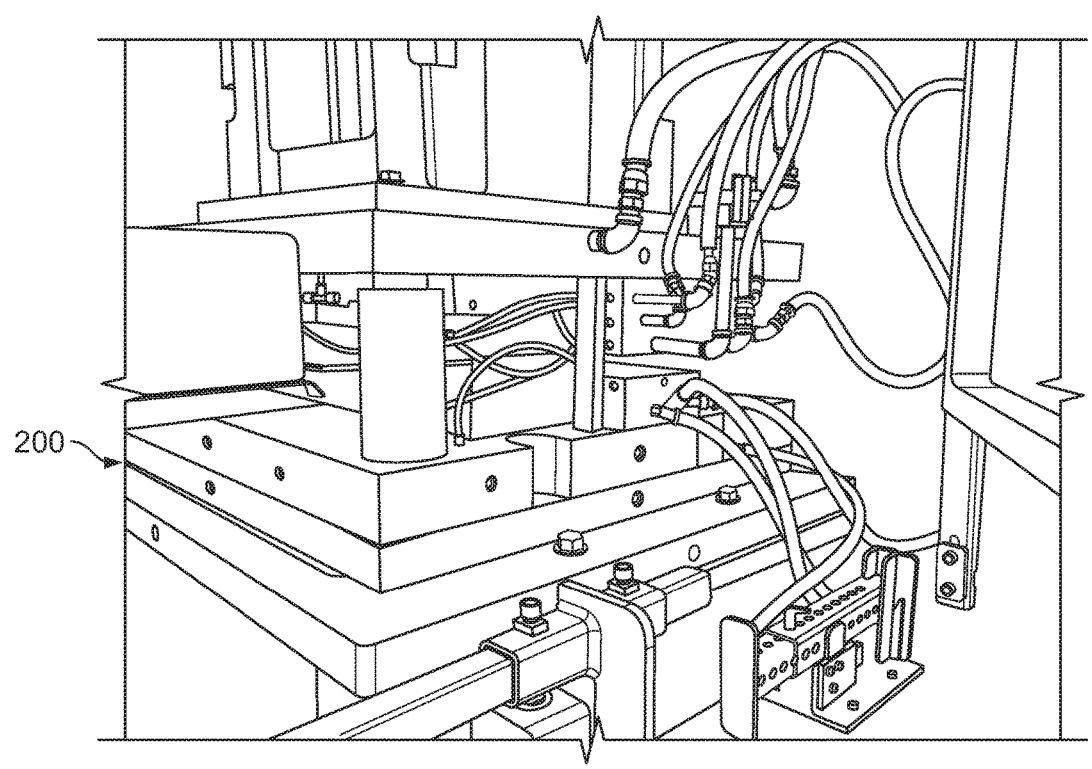
FIG. 11 is a representation of the improved disposable aluminum lid being stamped.
Figure 12:
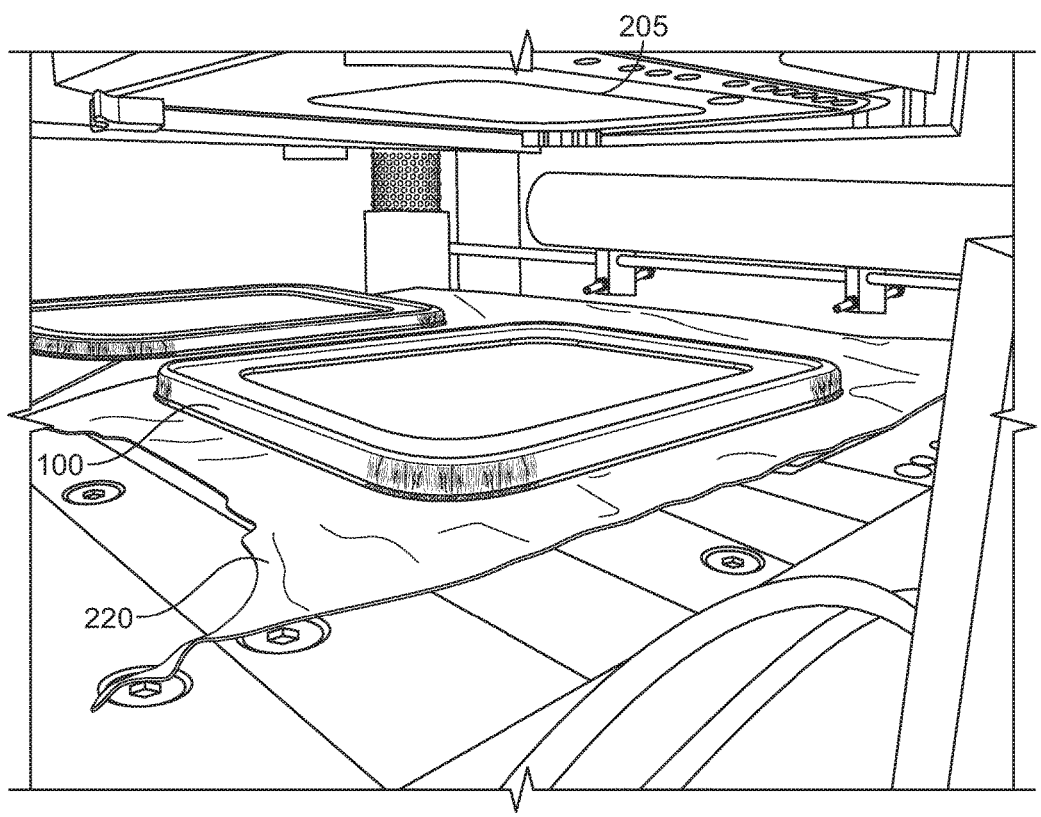
FIG. 12 is a representation of the improved disposable aluminum lid after being stamped in the stamp machine.
Figure 13:
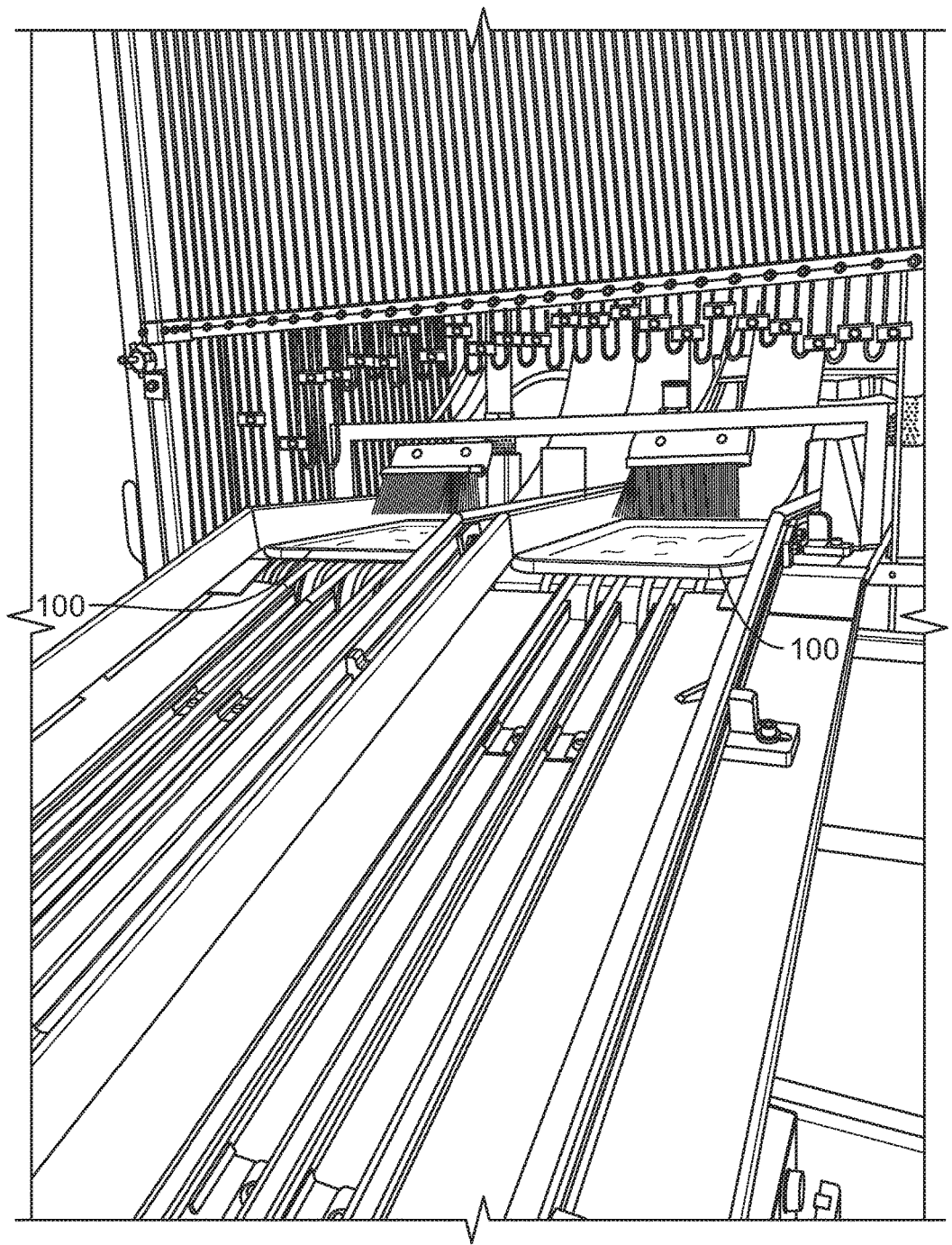
FIG. 13 is a representation of the output of the stamp machine showing the improved disposable aluminum lid existing the stamp machine.
Figure 14:
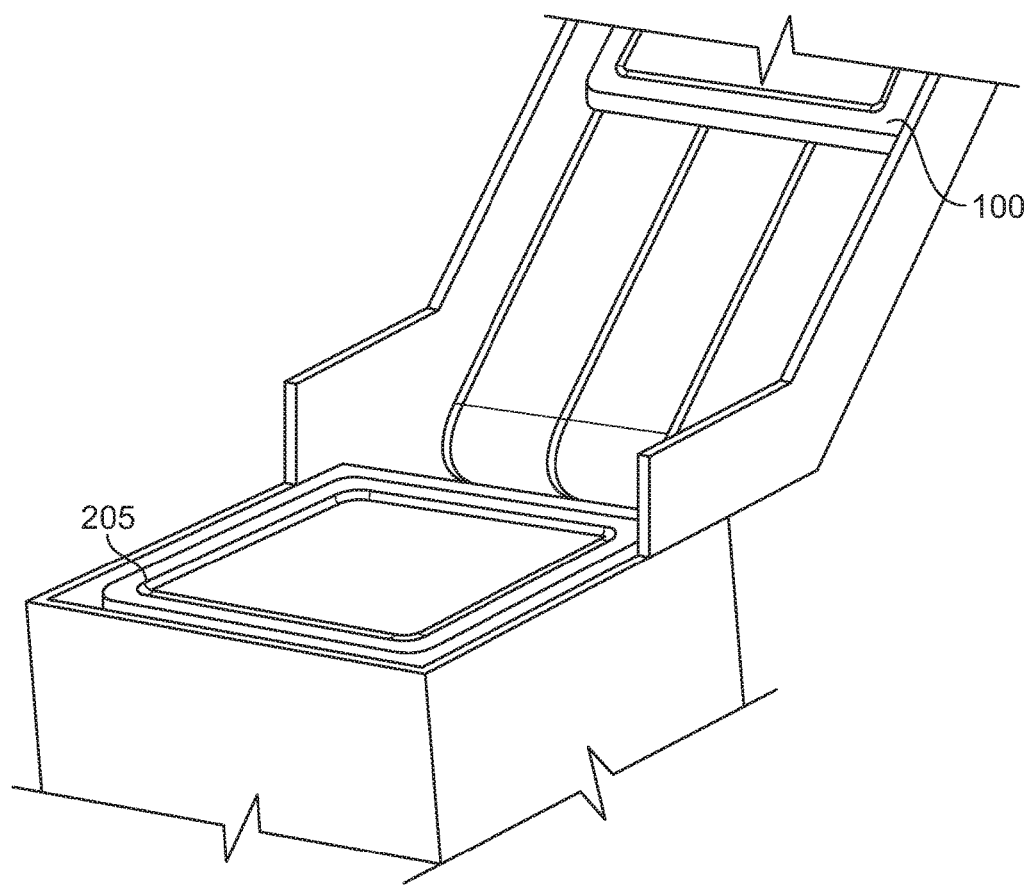
FIG. 14 is a representation of the improved disposable aluminum lid being aligned for stacking.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or claims of the embodiments illustrated.

Figure 16:
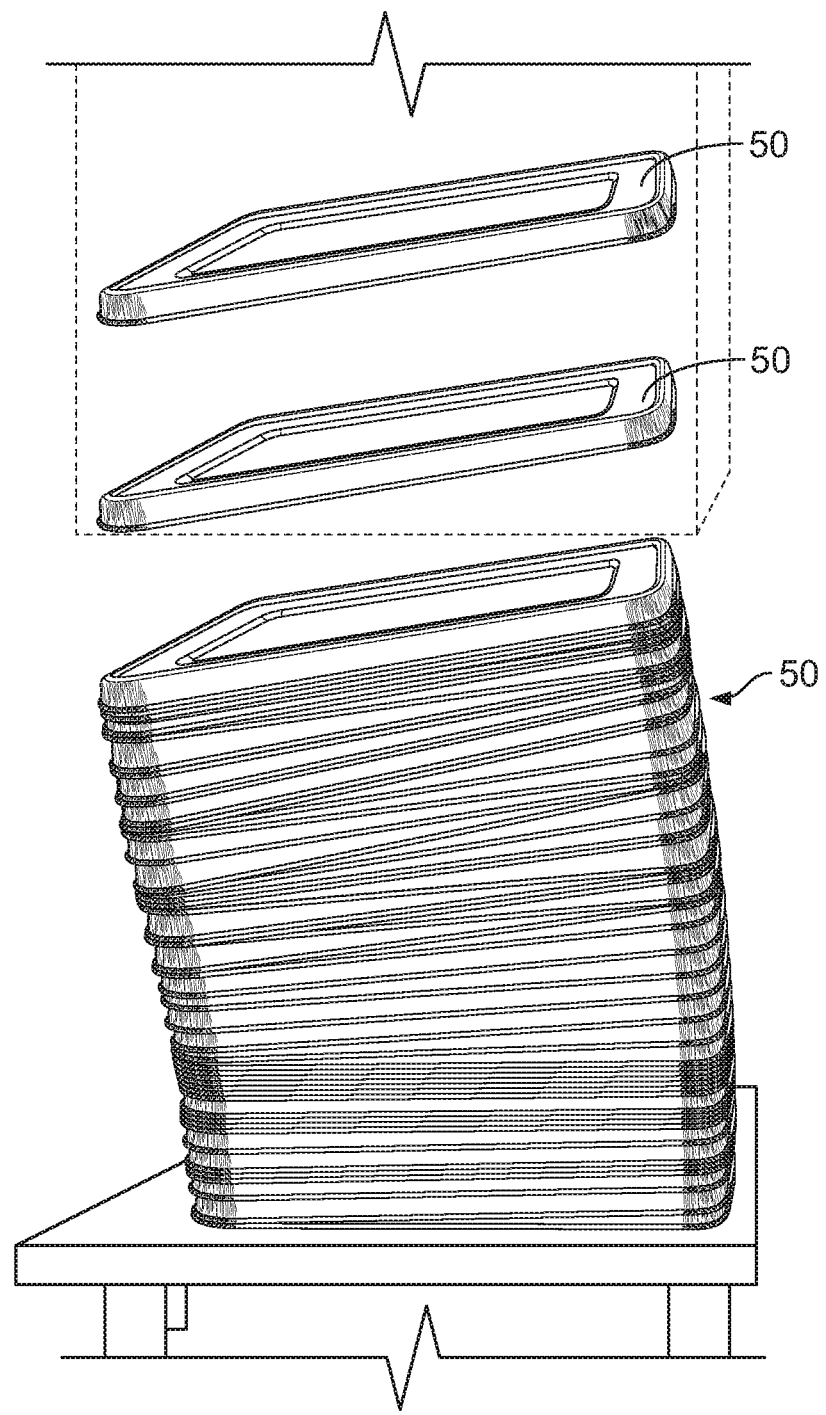
FIG. 16 is an illustration of prior art lids stacked and nested for packaging before shipping.

With reference to Prior Art FIGS. 1A through 3, there is provided a disposable lid formed from stamping aluminum, generally referenced a lid 50. The prior art lid 50 includes a top base 52 that terminates about an edge 54 to raised ridge 56 around the periphery of the edge 54. The raised ridge 56 extends into a downwardly extending skirt 58. The skirt terminates into a rolled lip 60 formed only into the sides (62/64) of the lid. The corners 66 of the skirt 58 are crimped when formed but always terminate into a free edge 68 of aluminum. The crimped free edge 68 in the corners 66 always remain sharp. The sharpness of the corners are capable of cutting a user's fingers when handling. While the cuts may not be particularly deep when they occur, it still is a nuisance to the consumer to be cut. Moreover, complaints are continuous submitted to the manufacturers of disposable aluminum lids when a consumer is cut. As such there has always been a desire and need to improve the lids to avoid this issue. In addition to this major concern, disposable aluminum lids have always been manufactured in a very simplistic manner in that the angle defined between the raised ridge 56 and the downwardly extending skirt 58 are formed at a virtual right angle (FIG. 3) such that the skirt 58 extends downwardly in a substantially zero degree taper. As further explained below, from a material standpoint, when forming the lids, keeping the skirt at a zero degree taper will use less material, which will reduce expenses especially when the manufacturer is producing thousands of lids an hour. The major problem with this type of disposable aluminum lids is that the lids cannot stack or nest on top of each other without damaging the shape of the lid. Prior Art FIG. 16 illustrates disposable aluminum lids manufactured in accordance with the prior art stacked after forming and prior to shipment. The prior art disposable aluminum lids utilize a lot of space and are after slightly bent and thus slightly damaged when packaged and shipped. As such there is a desire and need to improve the lids to avoid this issue.

Figure 15:
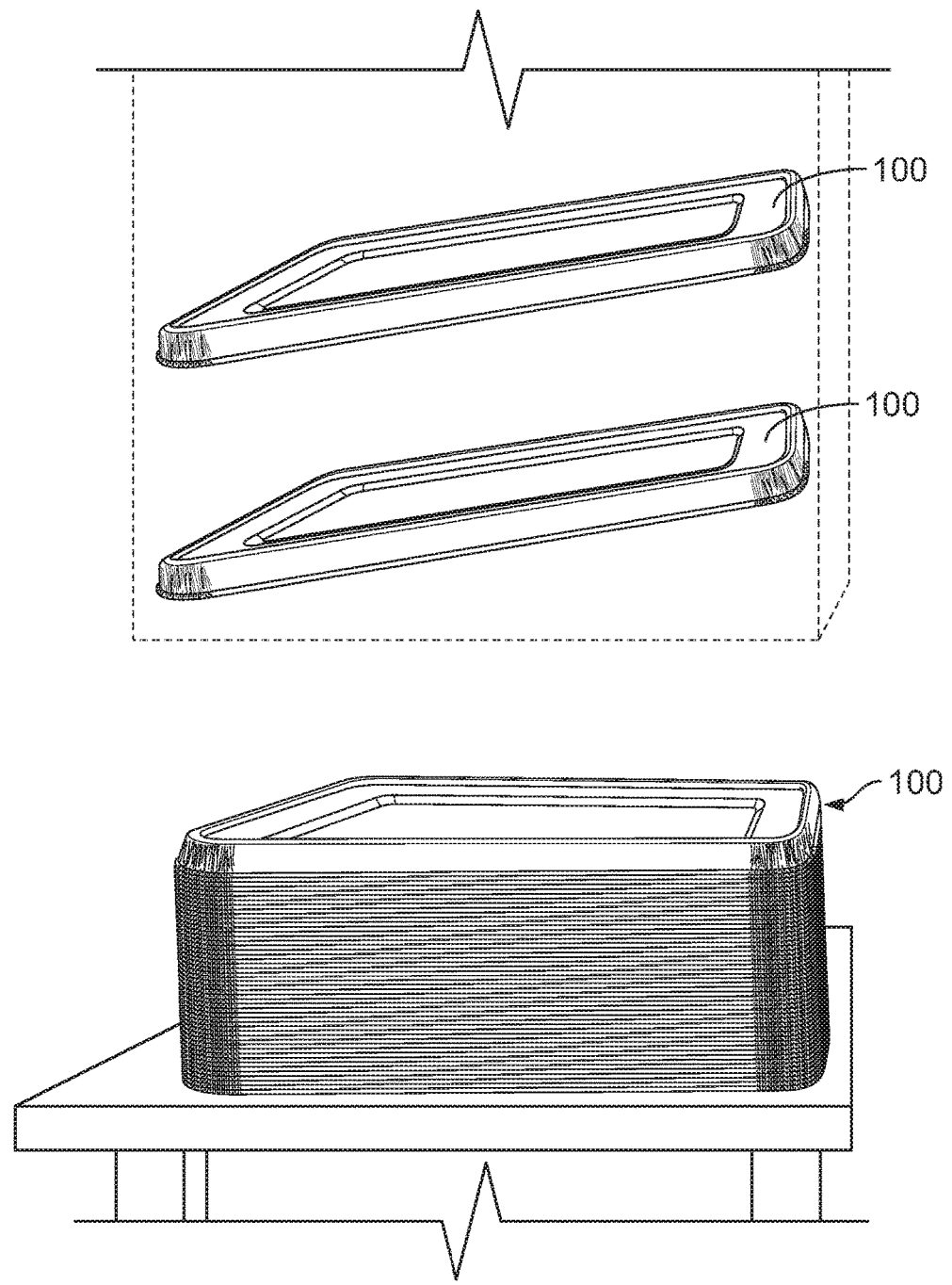
FIG. 15 is an illustration of improved disposable aluminum lids stacked and nested for packaging before shipping.

To solve the above concerns and problems an improved disposable aluminum lid was developed, referenced generally a numeral 100 (FIGS. 4A through 6). The improved disposable aluminum lid 100 is formed from stamping aluminum. The improved disposable aluminum lid 100 includes a top base 102 that terminates about an edge 104 to raised ridge 106 around the periphery of the edge 104. The raised ridge 106 extends into a downwardly extending skirt 108. The skirt terminates into a rolled lip 110 formed into the sides (112/114) of the improved disposable aluminum lid 100. In addition, during the forming of the improved disposable aluminum lid 100 the corners 116 of the skirt 108 are crimped and rolled into a corner rolled lip 111 of aluminum. The corner rolled lip 110 in the corners 116 prevents the user from cutting themselves when handling. In addition, the improved disposable aluminum lid 100 is formed with a slight tapering β (FIG. 6) between the raised ridge 106 and the downwardly extending skirt 108. Preferably the tapering β is defined at an angle between 3 and 10 degrees and more preferably at about 5 degrees. Therefore, when stacking or nesting the improved disposable aluminum lids, the lids nest easily and virtually perfectly on top of each other (FIG. 15). As such, the improved disposable aluminum lid 100 can be packaged and shipped without concern of damage to the lids.

From a material standpoint, when forming the improved disposable aluminum lid 100, a taper between the raised ridge 106 and the downwardly extending skirt 108 uses more material then if the skirt extends at a zero degree taper if the overall length extension of the skirt is the same. In comparing Prior Art FIG. 3 against FIG. 6 the overall length of the skirt is maintained at 0.6250 inches. In the Prior Art disposable aluminum lid 50 the length of material for the skirt length is the same at 0.6250 inches. However, in the improved disposable aluminum lid 100, the length of material would be calculated as $X/\sin(90°)=0.6250/\sin(85°)$, where X represents the length of the sidewall with the 5 degree taper. Once solved the length of the sidewall is 0.627 inches. Over the entire perimeter of the lid and multiplied by thousands of lids, there is a definite increase in costs to manufacture the improved disposable aluminum lid. However, the benefits outlined herein outweigh the increased costs.

Referring now also to FIGS. 7 through 14 there is shown a method of manufacturing the improved disposable aluminum lids 100. In the method of manufacturing, a die machine press 200 includes an upper shoe 205 and a lower shoe 210. A sheet of aluminum 220, fed from a roll 215, is positioned between the shoes, which are then hydrically pressed together forming the lid. The upper and lower shoes 205/210 are configured to stamp the improved disposable aluminum lids 100 with a slight tapering β between the raised ridge 106 and the downwardly extending skirt 108, and further configured to stamp the improved disposable aluminum lids 100 with a rolled lip 110 formed around the entire periphery of the downwardly extending skirt 108, which includes both the sides (112/114) and the corners 116 of the improved disposable aluminum lid 100.

Figure 17:
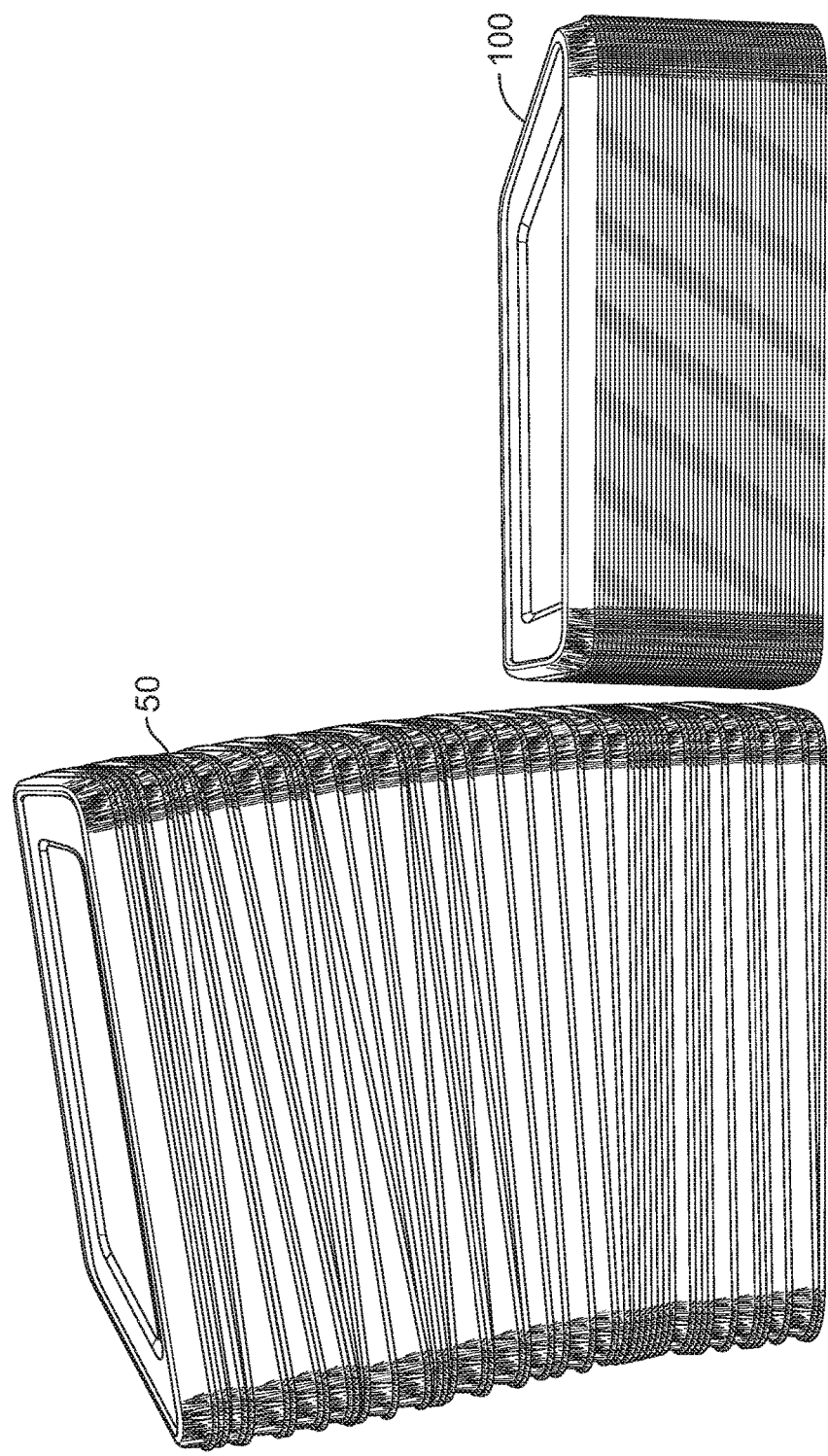
FIG. 17 is a side by side comparison of prior art lids and improved disposable aluminum lids nested for packaging before sipping.
Figure 18:
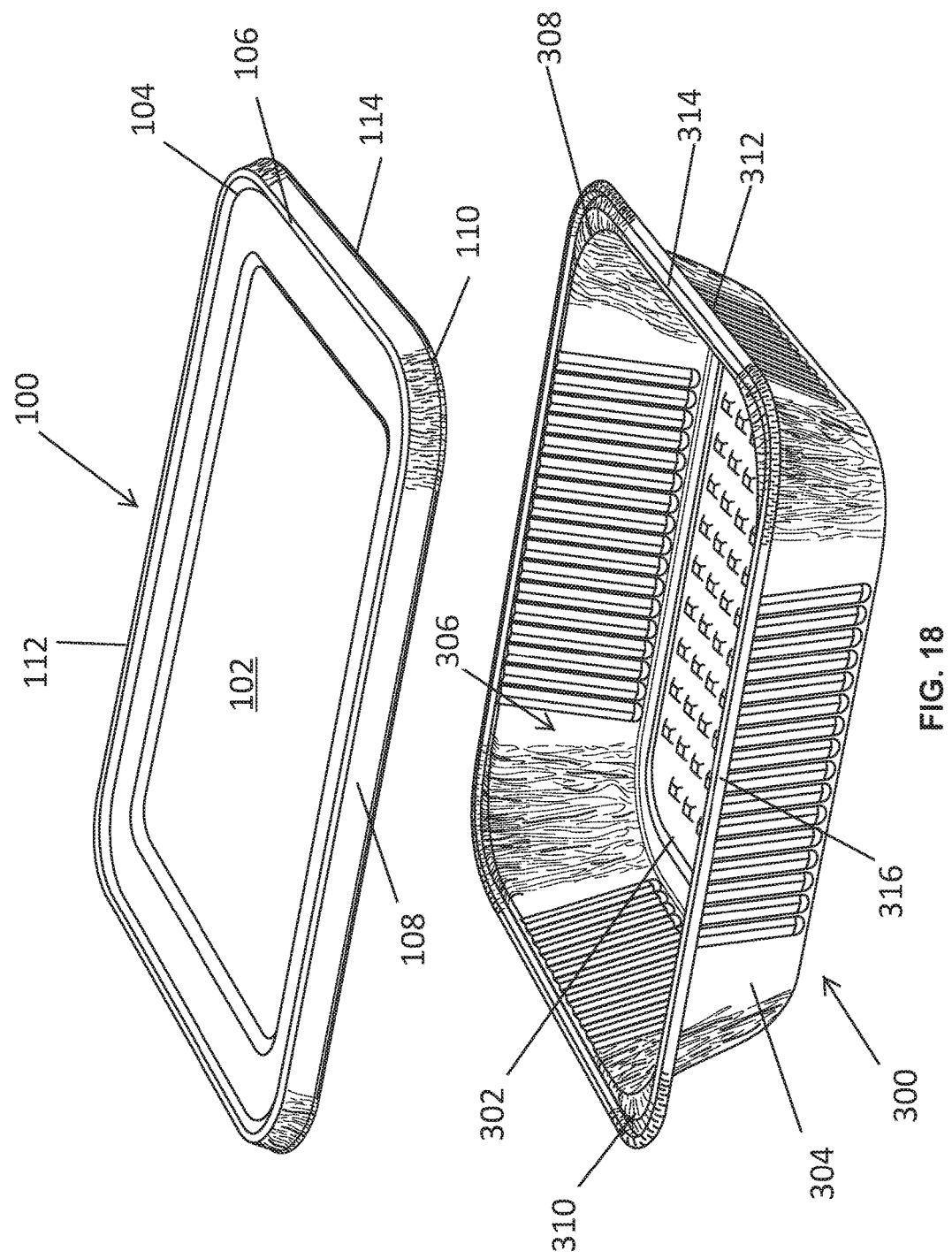
FIG. 18 is a perspective view of the improved disposable aluminum lid expanded away from a disposable aluminum pan.

Excess aluminum can then be recycled for future use. The improved disposable aluminum lids 100 when formed are then moved away from the stamping section for packaging. As shown in FIGS. 15-17, the improved disposable aluminum lids 100 when stacked show an improved nesting ability not shown in the prior art aluminum lids.

As provided by various embodiments of the present invention there is provided an improved disposable aluminum lid. The improved disposable aluminum lid is defined to include a lid stamped from aluminum and configured to have (a) a top base terminating around a periphery at an edge; (b) raised ridge extending around the periphery of the edge; (c) a skirt downwardly extending from the raised ridge; and (d) a rolled lip formed into the terminating edge of the skirt, wherein the rolled lip is formed into the entire terminating edge of the skirt including sides and corners defined by the lid. In other aspects the improved disposable aluminum lid is further configured to include an angle defined between the raised ridge and the downwardly extending skirt to be between 3 and 10 degrees, and is preferred to be at 5 degrees.

In other embodiments there is provided a method of manufacturing improved disposable aluminum lids to provide nesting of the lids. The method comprising the steps of (a) placing a sheet of aluminum between a pair of die shoes; (b) stamping the pair of die shoes together to form, from the sheet of an aluminum, an improved disposable aluminum lid; and (c) configuring the pair of die shoes, such that the improved disposable aluminum lid is configured to include: (i) a top base terminating around a periphery at an edge; (ii) a raised ridge extending around the periphery of the edge; (iii) a skirt downwardly extending from the raised ridge; (iv) a rolled lip formed into the terminating edge of the skirt, wherein the rolled lip is formed into the entire terminating edge of the skirt including sides and corners defined by the lid; and (v)an angle defined between the raised ridge and the downwardly extending skirt to be between 3 and 10 degrees. The method further comprising the step of nesting a plurality of the improved disposable aluminum lids on top of each other wherein the angle defined between the raised ridge and the downwardly extending skirt allows the plurality of nested improved disposable aluminum lids to rest over one another such that the entire rolled lip of one of the improved disposable aluminum lids rests adjacently over the entire rolled lip of an adjacent improved disposable aluminum lid positioned underneath thereto.

Referring now to FIGS. 18 through 23 there is illustrated in perspective views an improved disposable aluminum lid as detailed and explained herein above positioned for combination with a disposable aluminum pan. The lid 100 includes a top base 102 that terminates about an edge 104 to raised ridge 106 around the periphery of the edge 104. The raised ridge 106 extends into a downwardly extending skirt 108. The skirt terminates into a rolled lip 110 formed into the sides (112/114) of the improved disposable aluminum lid 100. In addition, during the forming of the improved disposable aluminum lid 100 the corners 116 of the skirt 108 are crimped and rolled into a corner rolled lip 111 of aluminum. The corner rolled lip 110 in the corners 116 prevents the user from cutting themselves when handling. In addition, the improved disposable aluminum lid 100 is formed with a slight tapering β (FIG. 6) between the raised ridge 106 and the downwardly extending skirt 108. Preferably the tapering β is defined at an angle between 3 and 10 degrees and more preferably at about 5 degrees. The pan 300 includes a bottom base 302 that terminates into a continuously extending side wall 304. The side wall 304 extends to form a well 306 there between. The side wall 304 terminates to a top edge 308, which extends therefrom to form a ledge 310. The ledge 310 extends outwardly from the side wall 304 and ends into a rolled lip 312 formed into the sides (314/316) of the pan.

Figure 19:
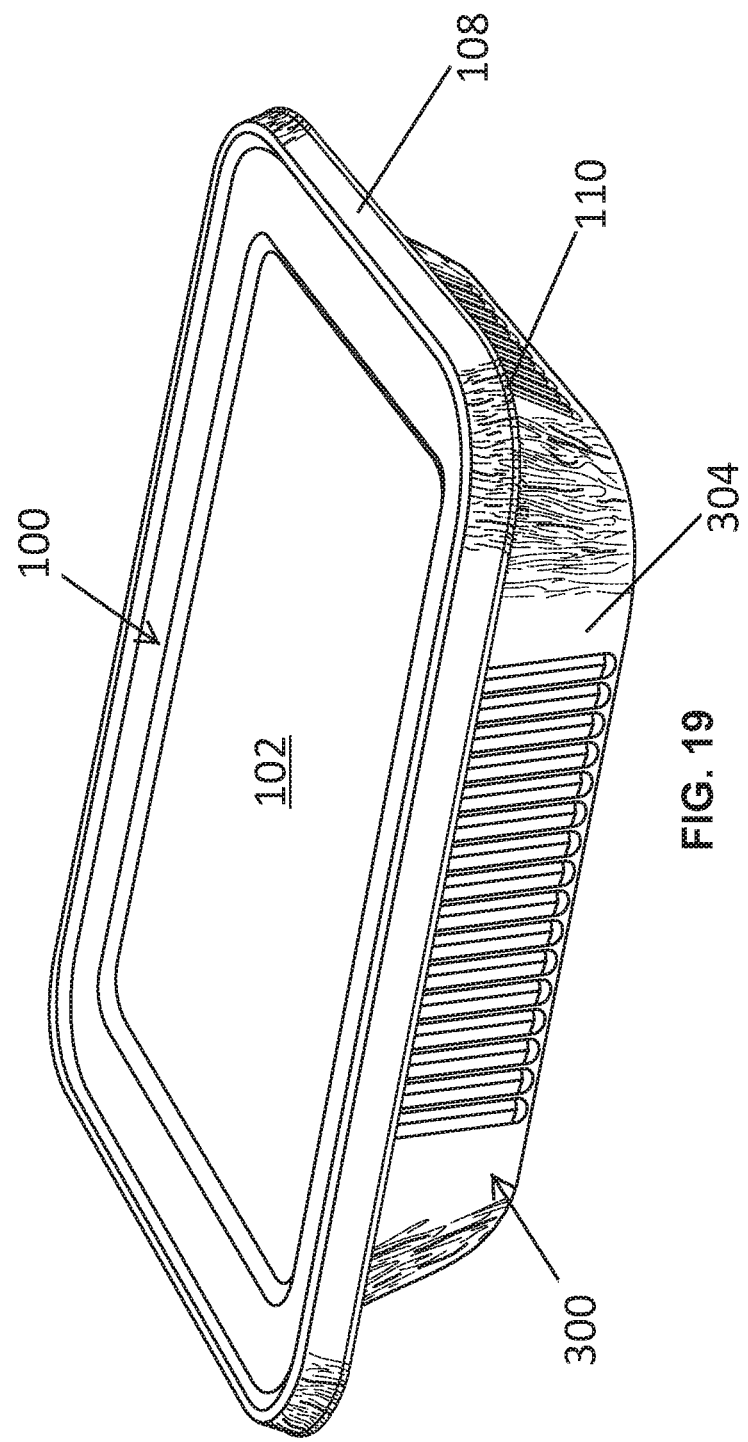
FIG. 19 is a perspective view of the improved disposable aluminum lid on the pan from FIG. 18.
Figure 20:
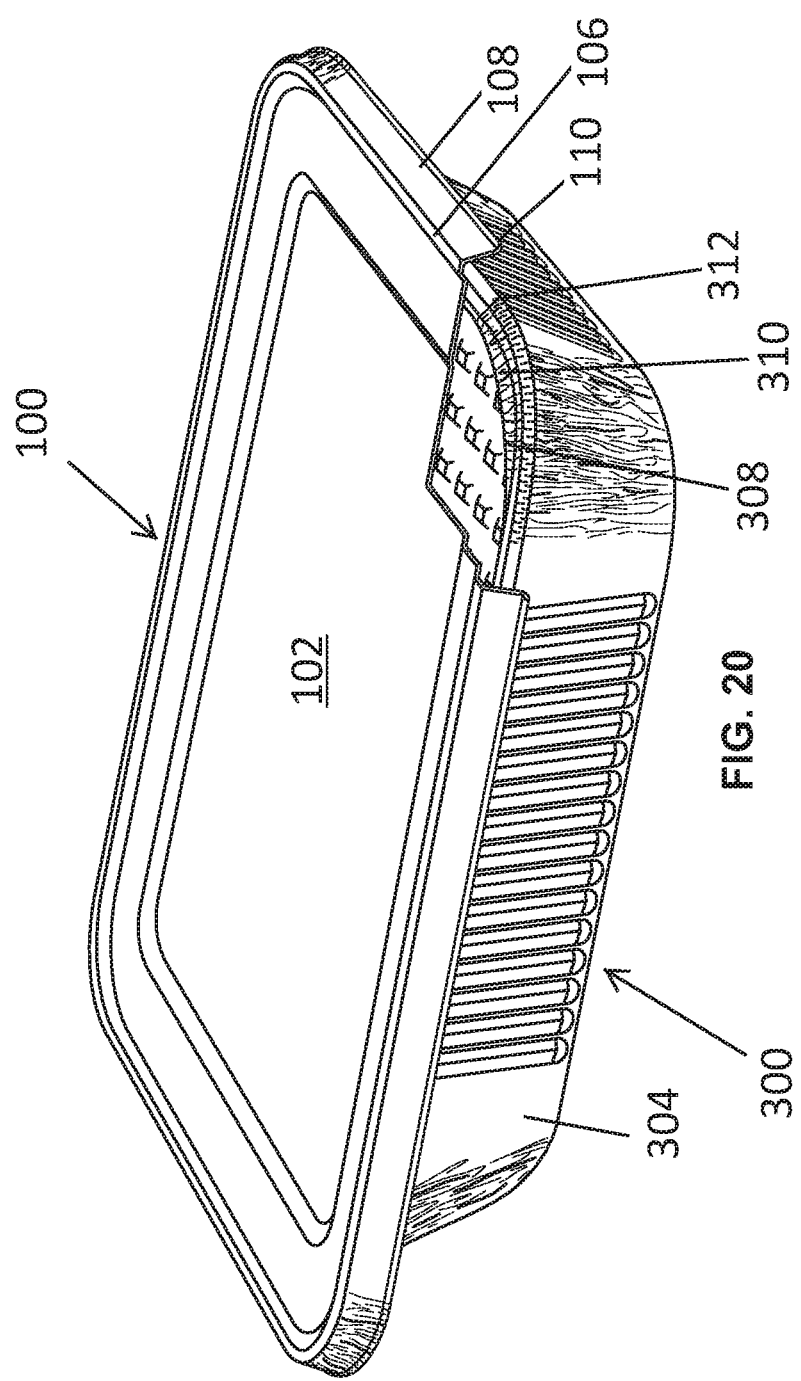
FIG. 20 is a perspective view of FIG. 19 with a corner of the lid cut away to illustrate that the downwardly extending skirt and rolled lip of the lid is not bent under the pan ledge.
Figure 21:
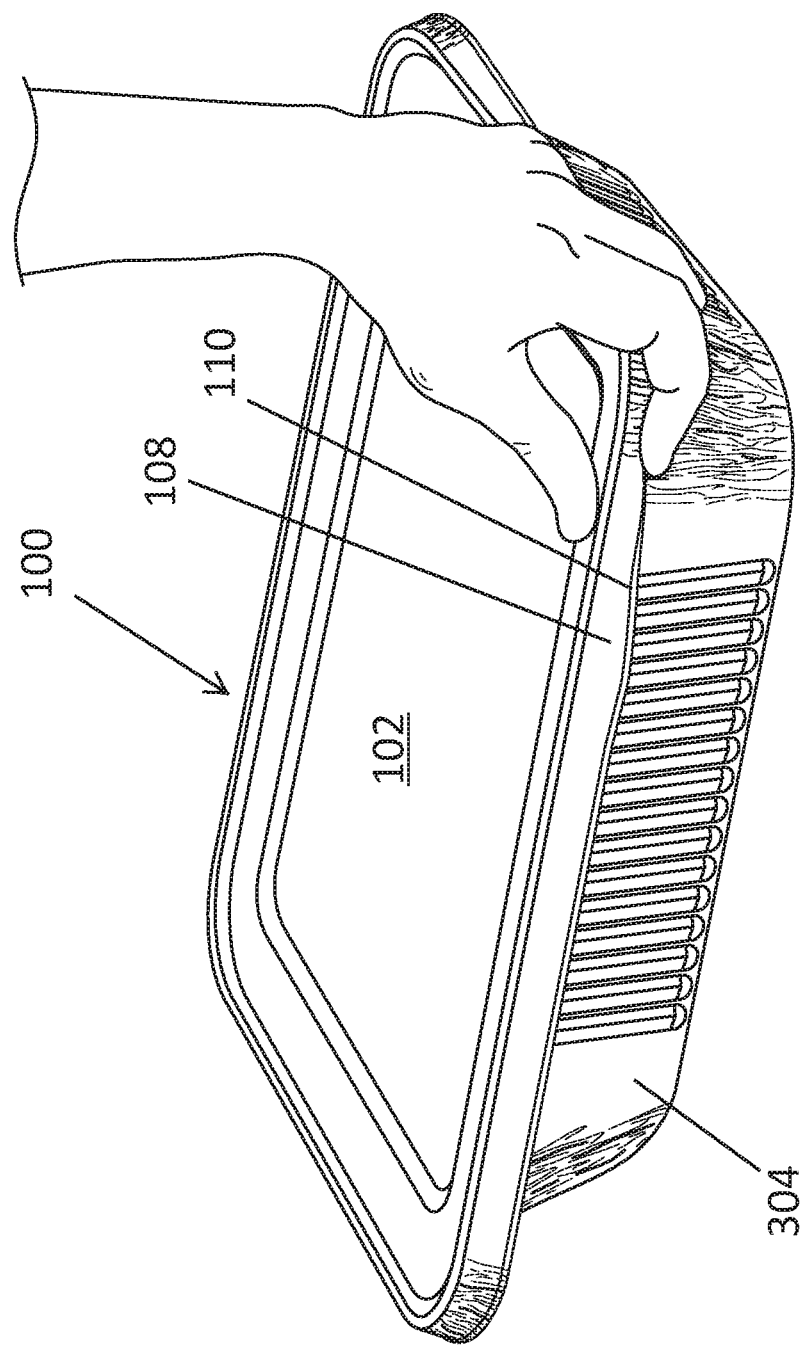
FIG. 21 is a perspective view of FIG. 19 illustrating a user bending the downwardly extending skirt and rolled lip under the pan ledge.
Figure 22A:
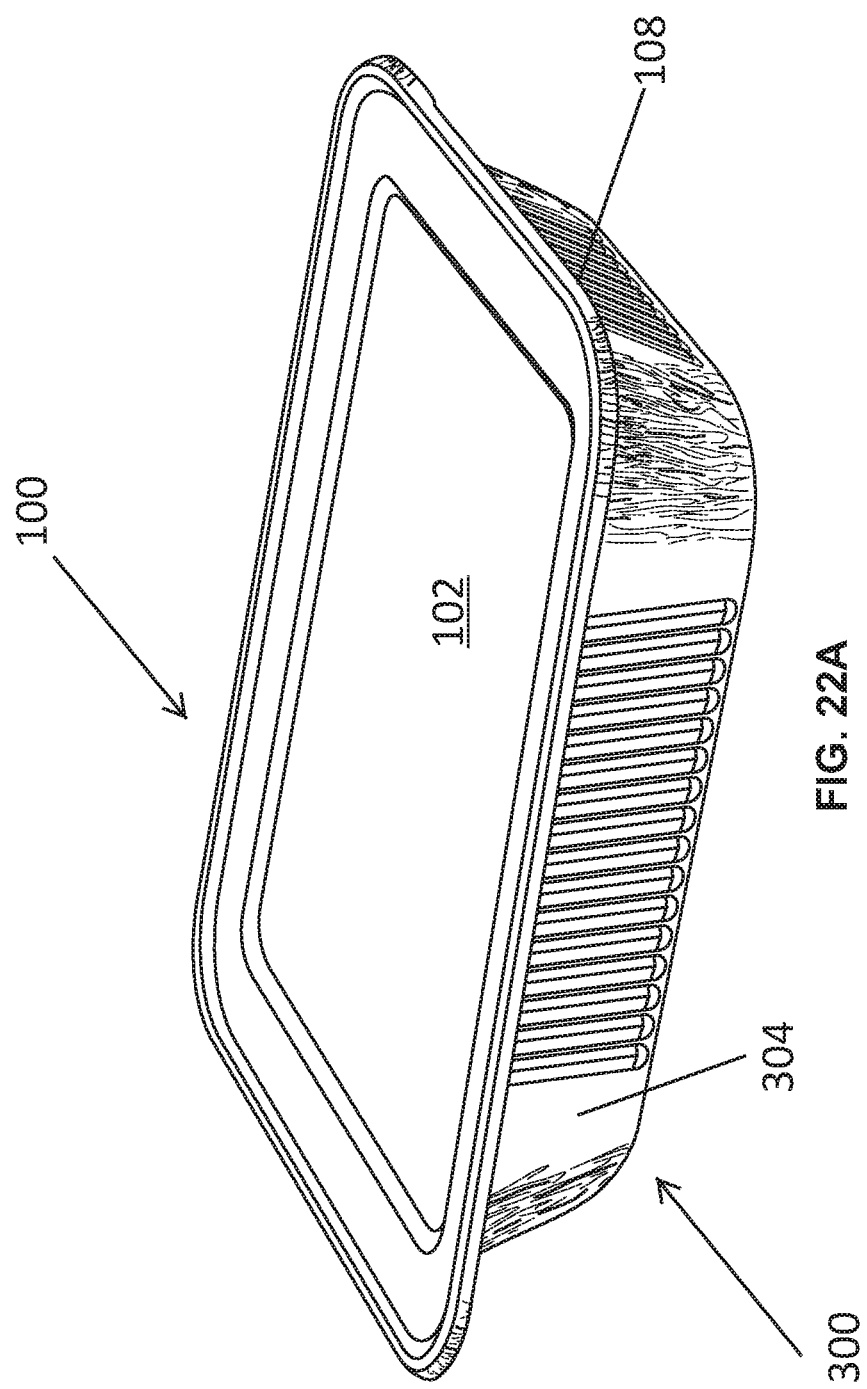
FIG. 22A is a perspective view of FIG. 20 illustrating the downwardly extending skirt and rolled lip being bent under the pan ledge entirely around the lid and pan, securing the lid to the pan.
Figure 22C:
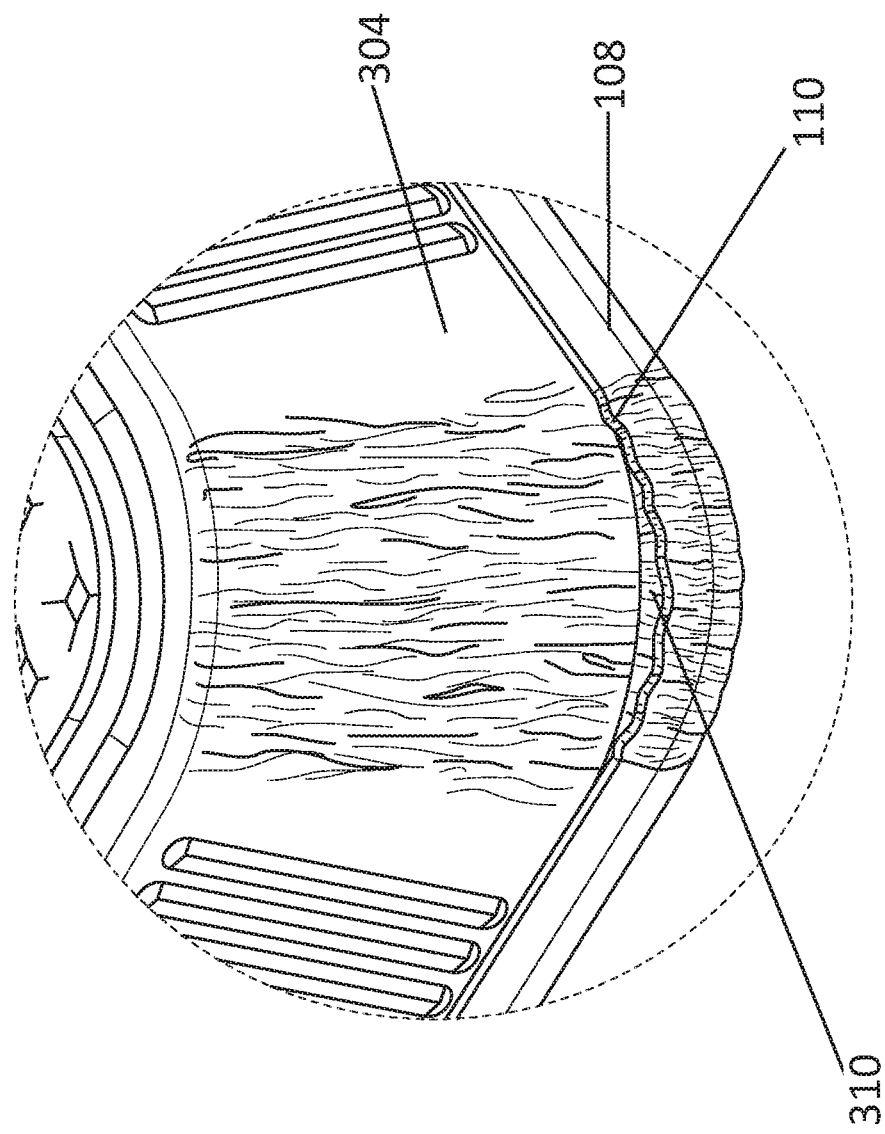
FIG. 22C is an enlarged view of the sectional view 22C from FIG. 22B.

Continuing to also refer to FIGS. 19-21, the lid 100 has a size defined such that when positioned on the pan the downwardly extending skirt 108 hangs over the ledge 310 of the pan. This allows the user to bend the extending skirt 108 and rolled lip 110 under the ledge 310 of the pan all away around the lid/pan essentially locking the lid onto the pan (FIG. 22).

To release the lid from the pan, the user will bend the extending skirt 108 and rolled lip 110 away from the ledge 310 of the pan all away around the pan, until the lid is released from the pan.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. An improved disposable aluminum lid used in combination with a pan, wherein the pan is defined as having a bottom base terminating into a side wall, the side wall extending continuously around the bottom base to form a well there between, the side wall includes a top edge that extends outwardly away from the well to form a ledge and wherein the ledge ends into a rolled lip form, the combination comprising:

the pan; and a lid stamped from aluminum, the lid being configured to include:

a top base terminating around a periphery at an edge, a skirt extending downwardly from the edge and extending continuously around the top base to form a well there-between, the skirt having an internal surface side facing the well and an external surface side, the skirt further having a lower edge configured to extend directly into a rolled lip and wherein the rolled lip is formed continuously into the lower edge of the skirt and uninterruptedly around the well covering all sides and all corners defined by the lid and wherein the rolled lip is further configured to abut the external surface side of the skirt; and wherein the lid is configured to have a size such that when positioned on top of the pan, the skirt and rolled lip, defined on the lid, hangs over the ledge, defined on the pan and wherein the skirt and rolled lip are bent against an underside surface, defined on the ledge, the lid and the pan are configured in a secured configuration.

2. An improved disposable aluminum lid for use with a pan, wherein the pan has a bottom base terminating into a side wall, the side wall extending continuously around the bottom base to form a well there between, the side wall includes a top edge that extends outwardly away from the well to form a ledge and wherein the ledge ends into a rolled lip form, the improved disposable aluminum lid is defined to comprise:

a top base terminating around a periphery at an edge, a skirt extending downwardly from the edge and extending continuously around the top base to form a well there-between, the skirt having an internal surface side facing the well and an external surface side, the skirt further having a lower edge configured to extend directly into a rolled lip and wherein the rolled lip is formed continuously into the lower edge of the skirt and uninterruptedly around the well covering all sides and all corners defined by the lid, and wherein the rolled lip is further configured to abut the external surface side of the skirt; and wherein the lid is configured to have a size such that when positioned on top of the pan, the skirt and rolled lip, defined on the lid, hangs over the ledge, defined on the pan and wherein the skirt and rolled lip are bent against an underside surface, defined on the ledge, the lid and the pan are configured in a secured configuration.

* * * * *